United States Patent
Sather et al.

(10) Patent No.: US 8,228,023 B2
(45) Date of Patent: Jul. 24, 2012

(54) CHARGING SYSTEMS AND METHODS FOR THIN-FILM LITHIUM-ION BATTERY

(75) Inventors: Jeffrey S. Sather, Otsego, MN (US); Roger L. Roisen, Minnetrista, MN (US); Jeffrey D. Mullin, Elk River, MN (US)

(73) Assignee: Cymbet Corporation, Elk River, MN (US)

( * ) Notice: Subject to any disclaimer, the term of this patent is extended or adjusted under 35 U.S.C. 154(b) by 1112 days.

(21) Appl. No.: 12/069,440

(22) Filed: Feb. 8, 2008

(65) Prior Publication Data
US 2008/0203972 A1    Aug. 28, 2008

Related U.S. Application Data

(60) Provisional application No. 60/889,264, filed on Feb. 9, 2007.

(51) Int. Cl.
*H01M 10/44* (2006.01)
*H01M 6/40* (2006.01)
*H01M 6/12* (2006.01)
*H01M 6/00* (2006.01)

(52) U.S. Cl. ........ 320/101; 429/124; 429/162; 29/623.1

(58) Field of Classification Search .......... 429/122–300; 29/623.1–623.5; 320/101
See application file for complete search history.

(56) References Cited

U.S. PATENT DOCUMENTS

| | | | |
|---|---|---|---|
| 5,314,765 A | 5/1994 | Bates | |
| 5,338,625 A | 8/1994 | Bates et al. | |
| 5,445,906 A | 8/1995 | Hobson et al. | |
| 5,512,147 A | 4/1996 | Bates et al. | |
| 5,561,004 A | 10/1996 | Bates et al. | |
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 5,654,084 A | 8/1997 | Egert | |
| 5,705,293 A | 1/1998 | Hobson | |
| 6,805,998 B2 | 10/2004 | Jenson et al. | |

(Continued)

FOREIGN PATENT DOCUMENTS

WO    WO01/73864    10/2001

(Continued)

OTHER PUBLICATIONS

Sukumar, et al., "Switch array system for thin film lithium microbatteries," Journal of Power Sources, 136 (2004) 401-407.

(Continued)

*Primary Examiner* — Richard V Muralidar
(74) *Attorney, Agent, or Firm* — Kagan Binder, PLLC

(57) ABSTRACT

A method and apparatus for a unitary battery and charging circuit. Also, having a power conversion system includes a variable charging source and an energy storage device. The power conversion circuit also includes a charging circuit coupled to the variable charging source and the energy storage device, the energy storage device being charged by the variable charging source. Further, the circuit includes an energy storage device isolation circuit configured to isolate the energy storage device from discharging when power from the variable charging source is below a predetermined threshold. Further still, the conversion circuit includes a restart circuit configured to restart the charging circuit by utilizing power from the energy storage device when charging power has dropped below a predetermined level.

5 Claims, 22 Drawing Sheets

U.S. PATENT DOCUMENTS

| | | | |
|---|---|---|---|
| 6,924,164 B2 * | 8/2005 | Jenson | 438/48 |
| 7,131,189 B2 * | 11/2006 | Jenson | 29/730 |
| 7,211,351 B2 | 5/2007 | Klaassen | |
| 7,433,655 B2 * | 10/2008 | Jacobs et al. | 455/90.3 |
| 2002/0037756 A1 | 3/2002 | Jacobs et al. | |
| 2002/0171399 A1 | 11/2002 | Kitagawa | |
| 2004/0029311 A1 | 2/2004 | Snyder et al. | |
| 2004/0258984 A1 | 12/2004 | Ariel et al. | |
| 2005/0237686 A1 | 10/2005 | Satoh et al. | |
| 2006/0132093 A1 | 6/2006 | Nguyen | |
| 2008/0001577 A1 | 1/2008 | Sather | |

FOREIGN PATENT DOCUMENTS

| | | |
|---|---|---|
| WO | WO2005/067645 | 7/2005 |
| WO | WO 2007/048052 | 4/2007 |

OTHER PUBLICATIONS

International Search Report mailed Feb. 24, 2009 (7 pgs).

* cited by examiner

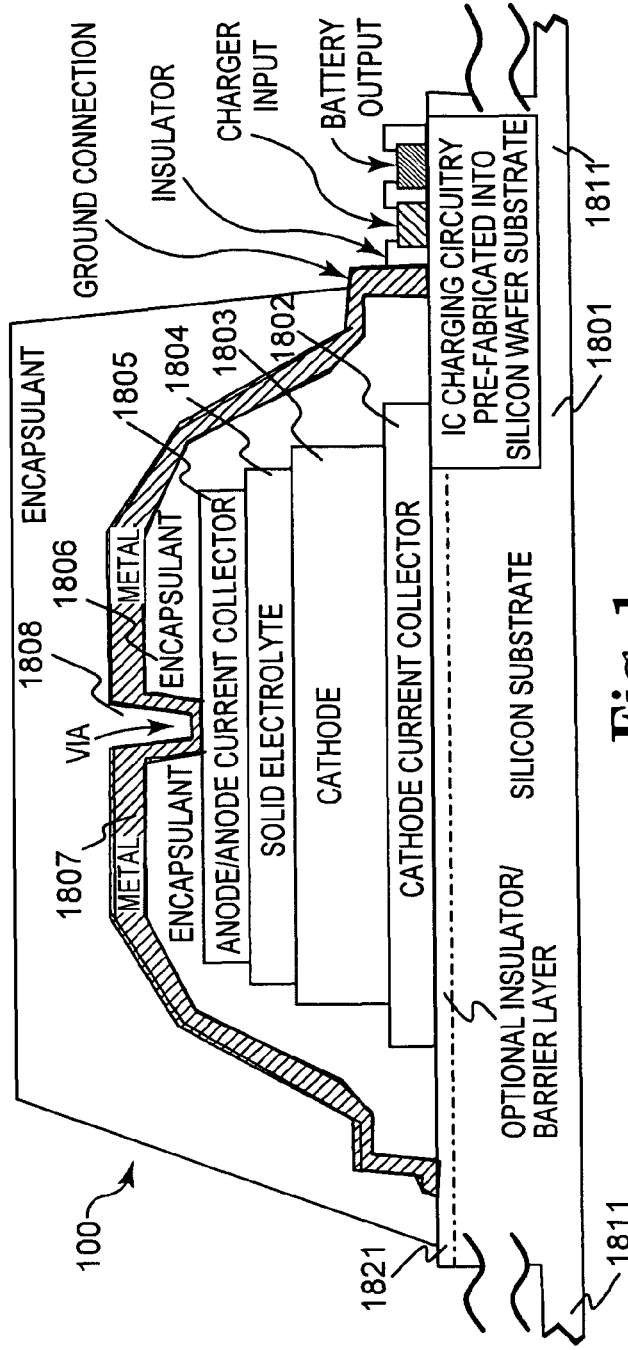
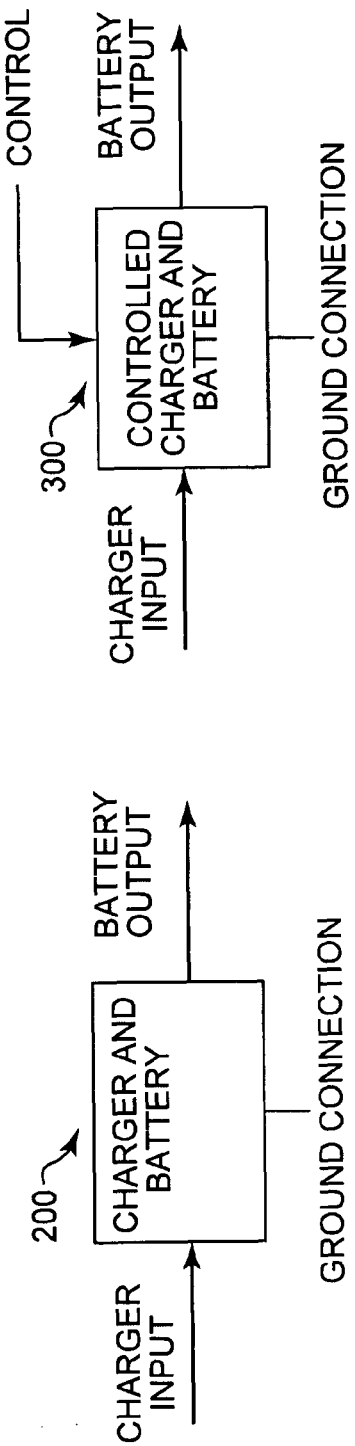
Fig. 1
Fig. 2
Fig. 3

CHARGING SYSTEMS AND METHODS FOR THIN-FILM LITHIUM-ION BATTERY

REFERENCE TO RELATED APPLICATIONS

This application claims priority to U.S. Provisional Patent Application No. 60/889,264 filed Feb. 9, 2007, entitled "UNITARY PACKAGED MICROBATTERY AND CHARGING CIRCUIT AND METHOD", by Jeffrey J. Sather and Roger L. Roisen, which is herein incorporated by reference.

This application is also related to U.S. Provisional Patent Application 60/806,458 entitled "METHODS OF RECHARGING A THIN FILM BATTERY, AND USE IN A WIRELESS TIRE-PRESSURE SENSOR" filed Jun. 30, 2006 by Jeffrey J. Sather; U.S. Provisional Patent Application 60/807,713 entitled "METHOD AND APPARATUS FOR SOLID-STATE MICROBATTERY PHOTOLITHOGRAPHIC SINGULATION AND PASSIVATION FROM A SUBSTRATE" filed Jul. 18, 2006 by M. Wallace et al.; U.S. patent application Ser. No. 10/895,445 entitled "LITHIUM/AIR BATTERIES WITH LiPON AS SEPARATOR AND PROTECTIVE BARRIER AND METHOD" filed Oct. 16, 2003 by J. Klaassen; U.S. patent application Ser. No. 11/031,217 entitled "LAYERED BARRIER STRUCTURE HAVING ONE OR MORE DEFINABLE LAYERS AND METHOD" filed Jan. 6, 2005 by D. Tarnowski et al.; and U.S. patent application Ser. No. 11/458,091 entitled "THIN-FILM BATTERIES WITH SOFT AND HARD ELECTROLYTE LAYERS AND METHOD" filed Jul. 17, 2006 by J. Klaassen, which are all incorporated herein in their entirety by reference.

BACKGROUND

The invention generally relates to systems and methods for electrical signal conditioning. In particular, the systems and methods for electrical conditioning are applied to solid-state thin-film battery charging.

Electronics have been incorporated into many portable devices such as computers, mobile phones, tracking systems, scanners, etc. One drawback to portable devices is the need to include the power supply with the device. Portable devices typically use batteries as power supplies. Batteries must have sufficient capacity to power the device for at least the length of time the device is in use. Sufficient battery capacity can result in a power supply that is quite heavy and/or large compared to the rest of the device. Accordingly, smaller and lighter batteries (i.e., power supplies) with sufficient energy storage are desired. Other energy storage devices, such as supercapacitors, and energy conversion devices, such as photovoltaics and fuel cells, are alternatives to batteries for use as power supplies in portable electronics and non-portable electrical applications.

Another drawback of conventional batteries is the fact that some are fabricated from potentially toxic materials that may leak and be subject to governmental regulation. Accordingly, it is desired to provide an electrical power source that is safe, solid-state and rechargeable over many charge/discharge life cycles.

One type of an energy-storage device is a solid-state, thin-film battery. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; and 5,705,293, each of which is herein incorporated by reference. U.S. Pat. No. 5,338,625 describes a thin-film battery, especially a thin-film microbattery, and a method for making same having application as a backup or first integrated power source for electronic devices. U.S. Pat. No. 5,445,906 describes a method and system for manufacturing a thin-film battery structure formed with the method that utilizes a plurality of deposition stations at which thin battery component films are built up in sequence upon a web-like substrate as the substrate is automatically moved through the stations.

U.S. Pat. No. 6,805,998 (which is incorporated herein by reference) issued Oct. 19, 2004, by Mark L. Jenson and Jody J. Klaassen, and is assigned to the assignee of the present invention described a high-speed low-temperature method for depositing thin-film lithium batteries onto a polymer web moving through a series of deposition stations.

U.S. Pat. No. 7,211,351 entitled "LITHIUM/AIR BATTERIES WITH LIPON AS SEPARATOR AND PROTECTIVE BARRIER AND METHOD" by Jody J. Klaassen et al. (and which is incorporated herein by reference) describes a method for making lithium batteries including depositing LiPON on a conductive substrate (e.g., a metal such as copper or aluminum) by depositing a chromium adhesion layer on an electrically insulating layer of silicon oxide by vacuum sputter deposition of 500 Å of chromium followed by 5000 Å of copper. In some embodiments, a thin film of LiPON (Lithium Phosphorous OxyNitride) is then formed by low-pressure (<10 mtorr) sputter deposition of lithium orthophosphate ($Li_3PO_4$) in nitrogen. In some embodiments of the Li-air battery cells, LiPON was deposited over the copper anode contact to a thickness of 2.5 microns, and a layer of lithium metal was formed onto the copper anode contact by electroplating though the LiPON layer in a propylene carbonate/LiPF6 electrolyte solution. In some embodiments, the air cathode was a carbon-powder/polyfluoroacrylate-binder coating (Novec-1700) saturated with a propylene carbonate/LiPF6 organic electrolyte solution. In other embodiments, a cathode-contact layer having carbon granules is deposited, such that atmospheric oxygen could operate as the cathode reactant. This configuration requires providing air access to substantially the entire cathode surface, limiting the ability to densely stack layers for higher electrical capacity (i.e., amphours). There is a need for rechargeable lithium-based batteries having improved passivation against air and water vapor with improved manufacturability, density, and reliability, and lowered cost.

The techniques herein below extend to those embodiments which fall within the scope of the appended claims, regardless of whether they accomplish one or more of the above-mentioned needs.

SUMMARY

What is provided is a method and apparatus for a unitary battery and charging circuit that includes a first substrate having integrated-circuit battery-charging circuitry thereon, and a cathode material, an anode material, and an electrolyte layer separating the cathode material from the anode material deposited on the substrate to form a battery, wherein the charging circuit is connected to the battery and encapsulated to form a surface-mount unitary package.

What is also provided is a power conversion system and method that includes a variable charging source and an energy storage device. The power conversion circuit also includes a charging circuit coupled to the variable charging source and the energy storage device, the energy storage device being charged by the variable charging source. Further, the circuit includes an energy storage device isolation circuit configured to isolate the energy storage device from discharging when power from the variable charging source is below a predetermined threshold. Further still, the conversion circuit includes a restart circuit configured to restart the charging circuit by utilizing power from the energy storage device when charging power has dropped below a predetermined level.

Further, what is provided is a charging system. The charging system comprises a variable charging source. The charging system also comprises an energy storage device. Further, the charging system comprises a charging circuit coupled to the variable charging source and the energy storage device. The energy storage device is charged by the variable charging source. The charging circuit includes a charge pump and a microcontroller controlling the charge pump. The charge pump boosts the charge to a predetermined threshold and the microcontroller controlling the output of the charge pump such that the output of the charge pump maintains a relatively steady output voltage at least for a period of time where sufficient charge power is available from the variable charging source.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which:

FIG. 1 is an exemplary schematic cross-section view of a partially manufactured layered structure 100 for a unitary package having a solid-state cell (e.g., Lithium-ion battery cell) built onto the silicon substrate and its charging circuitry built into the silicon substrate of some embodiments of the invention, also showing contact areas of the cell that are photolithographically defined and the cells (optionally photolithographic techniques are also used to singulate the cell with the exception of substrate support tabs).

FIG. 2 is an exemplary schematic of the unitary package having a solid-state cell (e.g., Lithiumion battery cell) and its charging circuitry (a 3-terminal device with input, output and ground terminals.

FIG. 3 is an exemplary schematic of the unitary package having a solid-state cell (e.g., Lithiumion battery cell) and its charging circuitry (a 4-terminal device with input, control signal to start and/or stop the charging, output and ground terminals).

DETAILED DESCRIPTION

Figure 4:
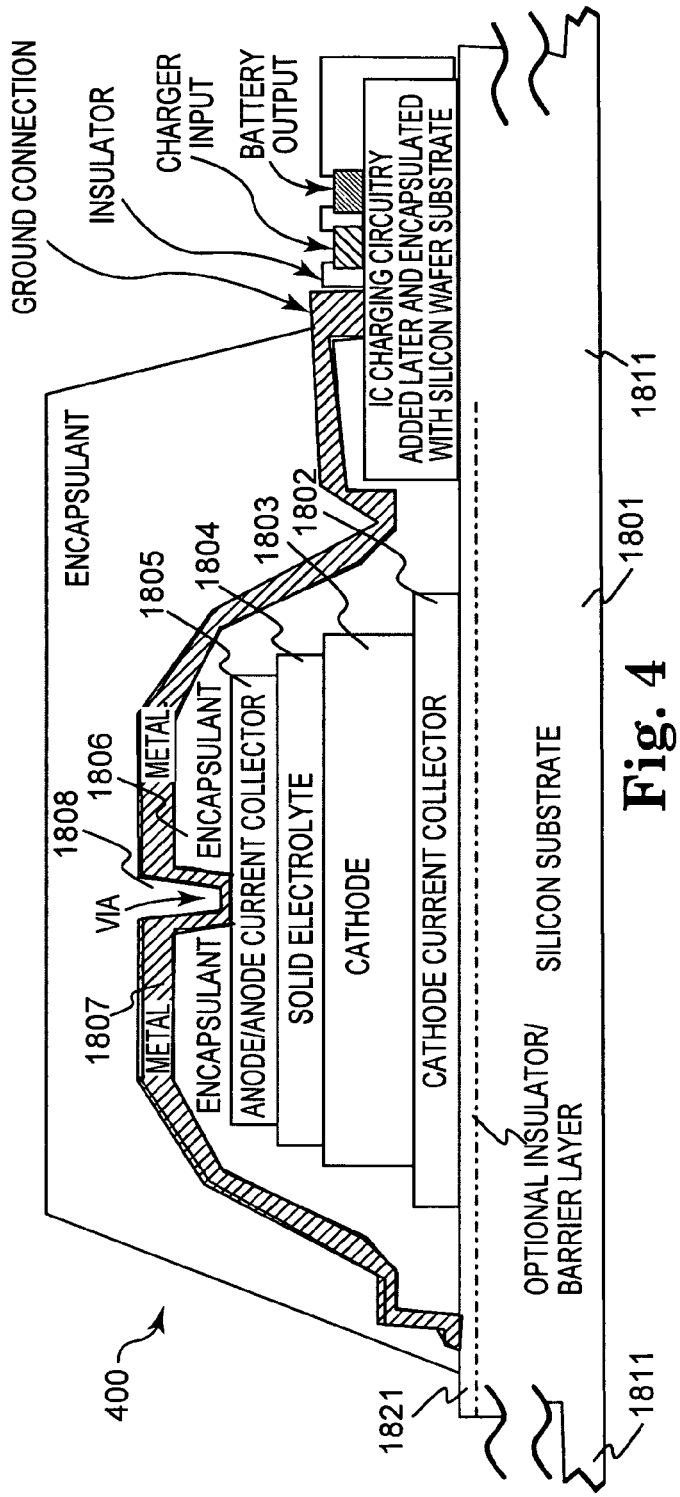
FIG. 4 is an exemplary schematic cross-section view of a partially manufactured layered structure 400 for a unitary package having a solid-state cell (e.g., Lithium-ion battery cell) built onto the silicon substrate and its charging circuitry, which is separately fabricated and later attached onto the silicon substrate of some embodiments of the invention.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In this description, the term metal applies both to substantially pure single metallic elements and to alloys or combinations of two or more elements, at least one of which is a metallic element.

The term substrate or core generally refers to the physical structure that is the basic work piece that is transformed by various process operations into the desired microelectronic configuration. In some embodiments, substrates include conducting material (such as copper, stainless steel, aluminum and the like), insulating material (such as sapphire, ceramic, or plastic/polymer insulators and the like), semiconducting materials (such as silicon), nonsemiconducting, or combinations of semiconducting and non-semiconducting materials. In some other embodiments, substrates include layered structures, such as a core sheet or piece of material (such as iron-nickel alloy and the like) chosen for its coefficient of thermal expansion (CTE) that more closely matches the CTE of an adjacent structure such as a silicon processor chip. In some such embodiments, such a substrate core is laminated to a sheet of material chosen for electrical and/or thermal conductivity (such as a copper, aluminum alloy and the like), which in turn is covered with a layer of plastic chosen for electrical insulation, stability, and embossing characteristics. An electrolyte is a material that conducts electricity by allowing movement of ions (e.g., lithium ions having a positive charge) while being non-conductive to electrons. An electrical cell or battery is a device having an anode and a cathode that are separated by an electrolyte. A dielectric is a material that is non-conducting to electricity, such as, for example, plastic, ceramic, or glass. In some embodiments, a material such as LiPON can act as an electrolyte when a source and sink for lithium are adjacent the LiPON layer, and can also act as a dielectric when placed between two metal layers such as copper or aluminum, which do not form ions that can pass through the LiPON. In some embodiments, devices include an insulating plastic/polymer layer (a dielectric) having wiring traces that carry signals and electrical power horizontally, and vias that carry signals and electrical power vertically between layers of traces.

The term vertical is defined to mean substantially perpendicular to the major surface of a substrate. Height or depth refers to a distance in a direction perpendicular to the major surface of a substrate.

FIG. 1 is a schematic cross-section view of a partially manufactured layered structure 100 for a unitary package having a solid-state cell (e.g., Lithium-ion battery cell) built onto the silicon substrate and its charging circuitry built into the silicon substrate of some embodiments of the invention, also showing contact areas of the cell that are photo-lithographically defined and the cells (optionally photo-lithographic techniques are also used to singulate the cell with the exception of substrate support tabs). In some embodiments, structure 100 includes stacked or multiple battery cells, with associated charging circuitry, providing a higher output voltage.

FIG. 2 is a schematic of the unitary package 200 having a solid-state cell (e.g., Lithiumion battery cell) and its charging circuitry (a 3-terminal device with input, output and ground terminals), according to some embodiments of the invention.

FIG. 3 is a schematic of the unitary package 300 having a solid-state cell (e.g., Lithiumion battery cell) and its charging circuitry (a 4-terminal device with input, control signal to start and/or stop the charging, output and ground terminals), according to some embodiments of the invention.

FIG. 4 is a schematic cross-section view of a partially manufactured layered structure 400 for a unitary package having a solid-state cell (e.g., Lithium-ion battery cell) built onto the silicon substrate and its charging circuitry, which is separately fabricated and later attached onto the silicon substrate of some embodiments of the invention.

Figure 5:
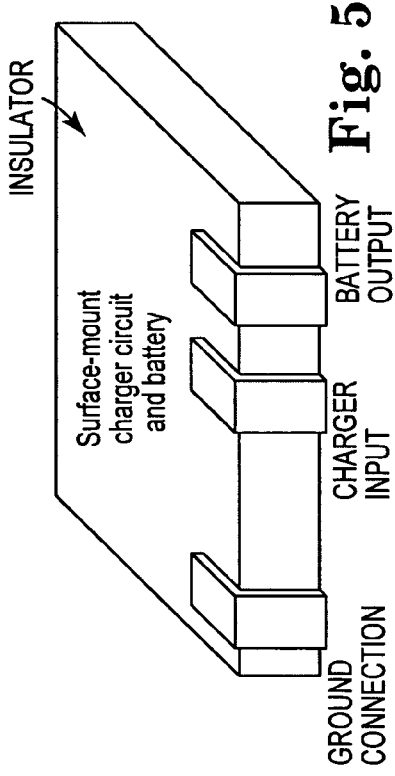
FIG. 5 is an exemplary schematic perspective view of the unitary package having a solid-state cell (e.g., Lithium-ion battery cell) and its charging circuitry encapsulated in the plastic of an SMT package (a 3-terminal device with input, output and ground terminals.

FIG. 5 is a schematic perspective view of the unitary package having a solid-state cell (e.g., Lithium-ion battery cell) and its charging circuitry encapsulated in the plastic of an SMT package (a 3-terminal device with input, output and ground terminals), according to some embodiments of the invention. In some embodiments, the battery and charging circuitry are encapsulated into a unitary package, such as a epoxy-encapsulated surface mount technology (SMT) package to be soldered to a printed circuit.

Figure 6:
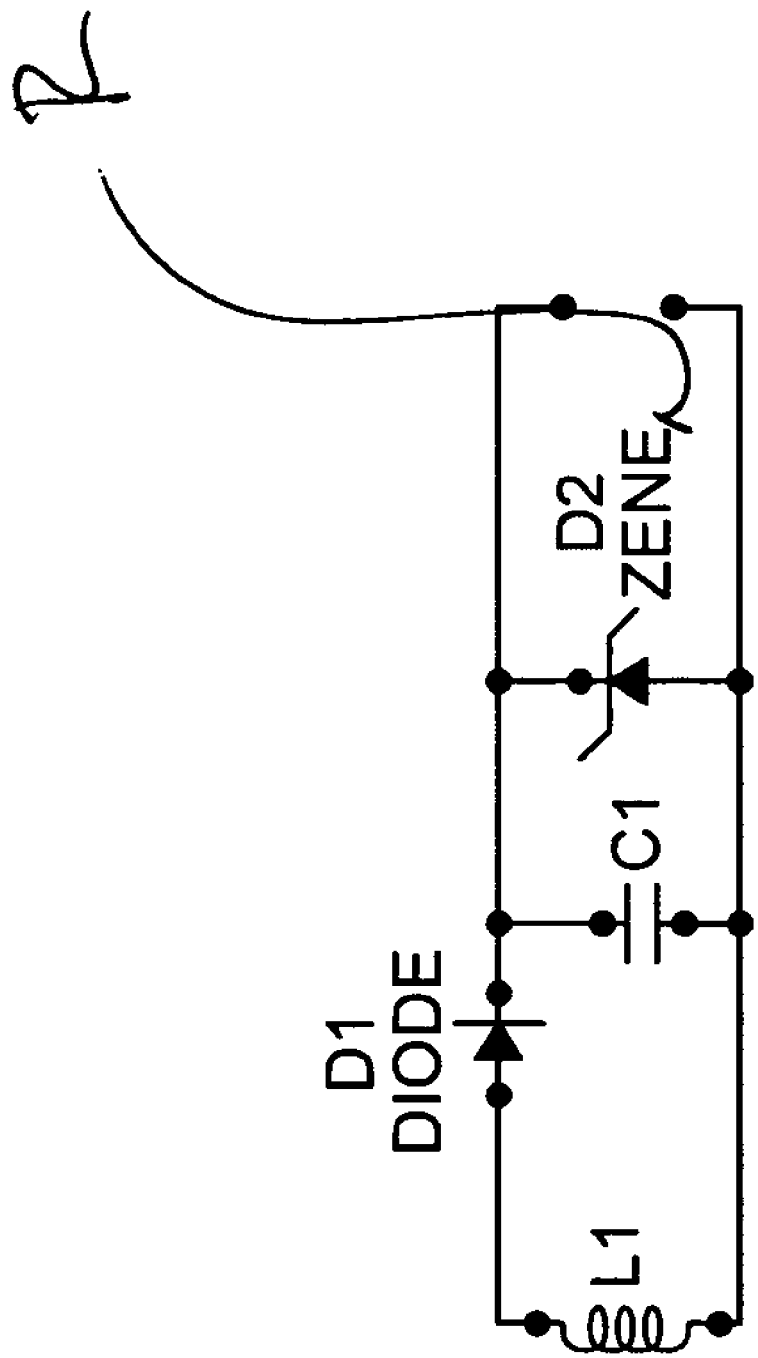
FIG. 6 is a schematic of the unitary package having a solid-state cell (e.g., Lithium-ion battery cell) and its inductive charging circuitry.

FIG. 6 is a schematic of the unitary package having a solid-state cell (e.g., Lithium-ion battery cell) and its inductive charging circuitry, according to some embodiments of the invention. Various methods may be employed to charge a thin-film battery that has the properties of being solid state and thus is more robust that conventional lithium-ion and lithium polymer cells with respect to recharge methods. In some embodiments, such methods include solar cells, magnetic induction, thermoelectric devices, and piezoelectric materials. What makes the circuit in FIG. 6 viable for the thin-film solid state battery is the fact that the battery may be charged efficiently using a potentiostatic charging regimen, without need for constant current sources, safety circuits, charge counters, or timers. Moreover, because the energy capacity of such a battery is relatively small compared with conventional Li-ion batteries, only a few microwatts to a few milliwatts of power is necessary to provide the charging current for charging the thin-film battery in a few minutes. In some embodiments, the charging device is amenable to direct integration with the battery, but is not essential that it be so integrated.

In some embodiments, as shown in FIG. 6, the battery is recharged by means of receiving energy through a secondary coil coupled magnetically to a primary coil, via electrical contacts and intervened by a voltage regulator to clamp the voltage at a level consistent with the charging voltage of the battery. The filtering circuitry (i.e., capacitor C1) may not be necessary, but rather pulsed DC current may be applied directly to the regulator. Other embodiments may employ and include Boost, Buck Boost, or other switching energy management topologies.

Figure 7:
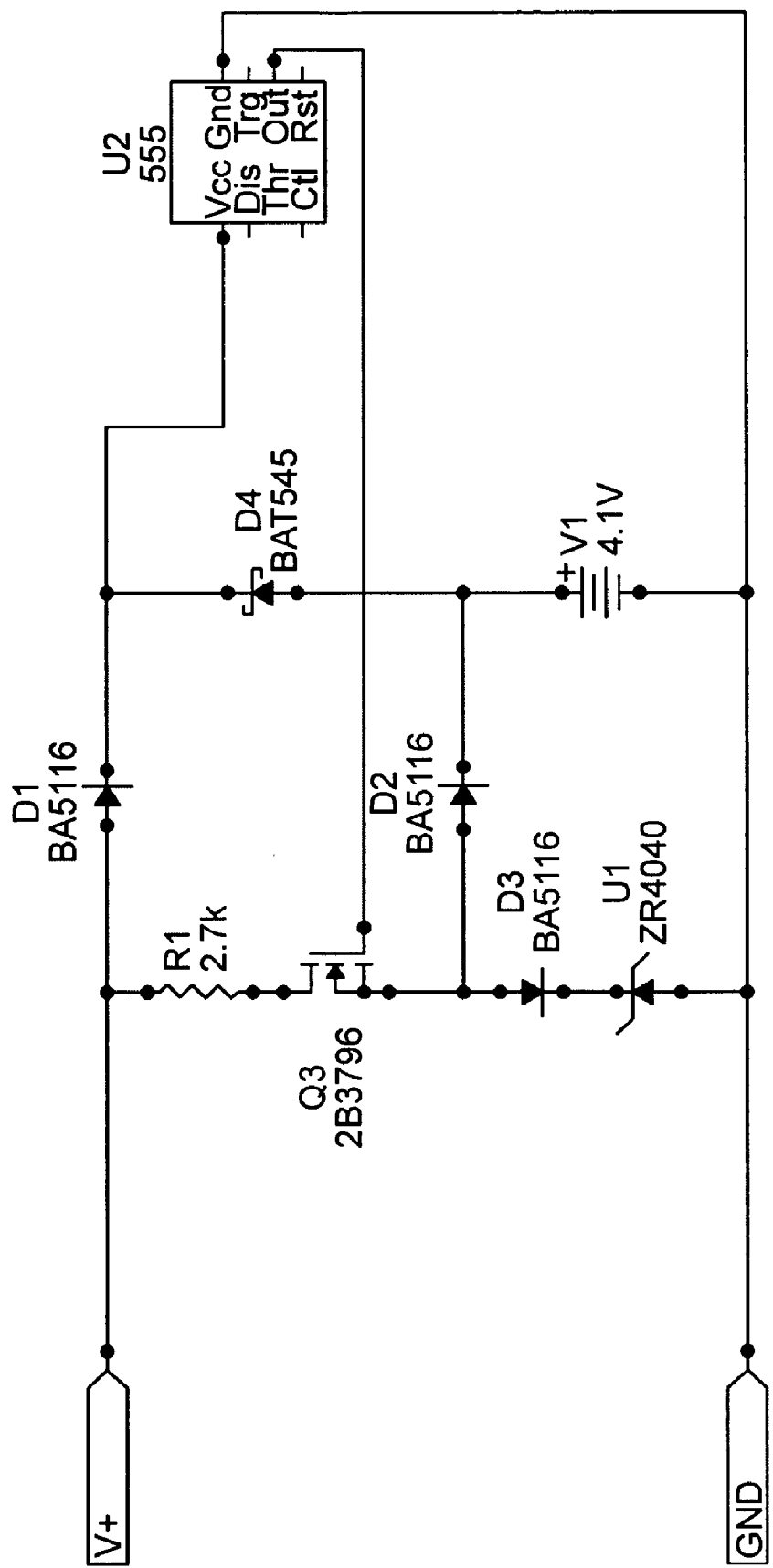
FIG. 7 is a schematic of the unitary package having a solid-state cell (e.g., Lithium-ion battery cell) and its charging circuitry (a 2-terminal device with input/output and ground terminals), according to some embodiments of the invention.

Referring now to FIG. 7 a schematic of the unitary package having a solid-state cell (e.g., Lithium-ion battery cell) and its charging circuitry (a 2-terminal device with input/output and ground terminals), according to some embodiments of the invention is depicted.

In FIG. 7 a control line is driven by a timer that charges the battery for a fixed period of time, then disconnects the charging voltage from the battery. This can be used in cases where extended charging times are detrimental to the battery and/or in cases where it is desirable to shut off the zener current to conserve power. The diagram shows a timer, but the control line could also be driven by any number of integrated circuits that have outputs that can be driven high or low according to elapsed time or other events occurring.

Diode D4 could also be a BAS116 in order to use a quad diode pack. U2 could be any number of devices, including a timer, microcontrollers, signal processor, supply supervisor, etc., having an output to control the activation/deactivation of the charge control circuit. Integration of these charge control components can be accomplished in a variety of ways:

1) The discrete components can be packaged in a multi-chip module using wirebonding or solder bumps to establish connections to the package exterior.

2) Some or all of the diodes, transistors, resistors—and timer control circuitry where applicable—can be fabricated on the silicon (or other substrate) wafer prior to battery manufacture. One of the metallization layers deposited during battery manufacture can serve as the interconnect between the charge control components and the battery itself, thus minimizing discrete component count, overall package footprint, and assembly cost.

Some or all of the diodes, transistors, resistors—and other functional semiconductor components—can be deposited before or after the battery has been fabricated on the substrate using ink jet or other printing techniques, thus minimizing discrete component count, overall package footprint, and assembly cost.

Figure 8:
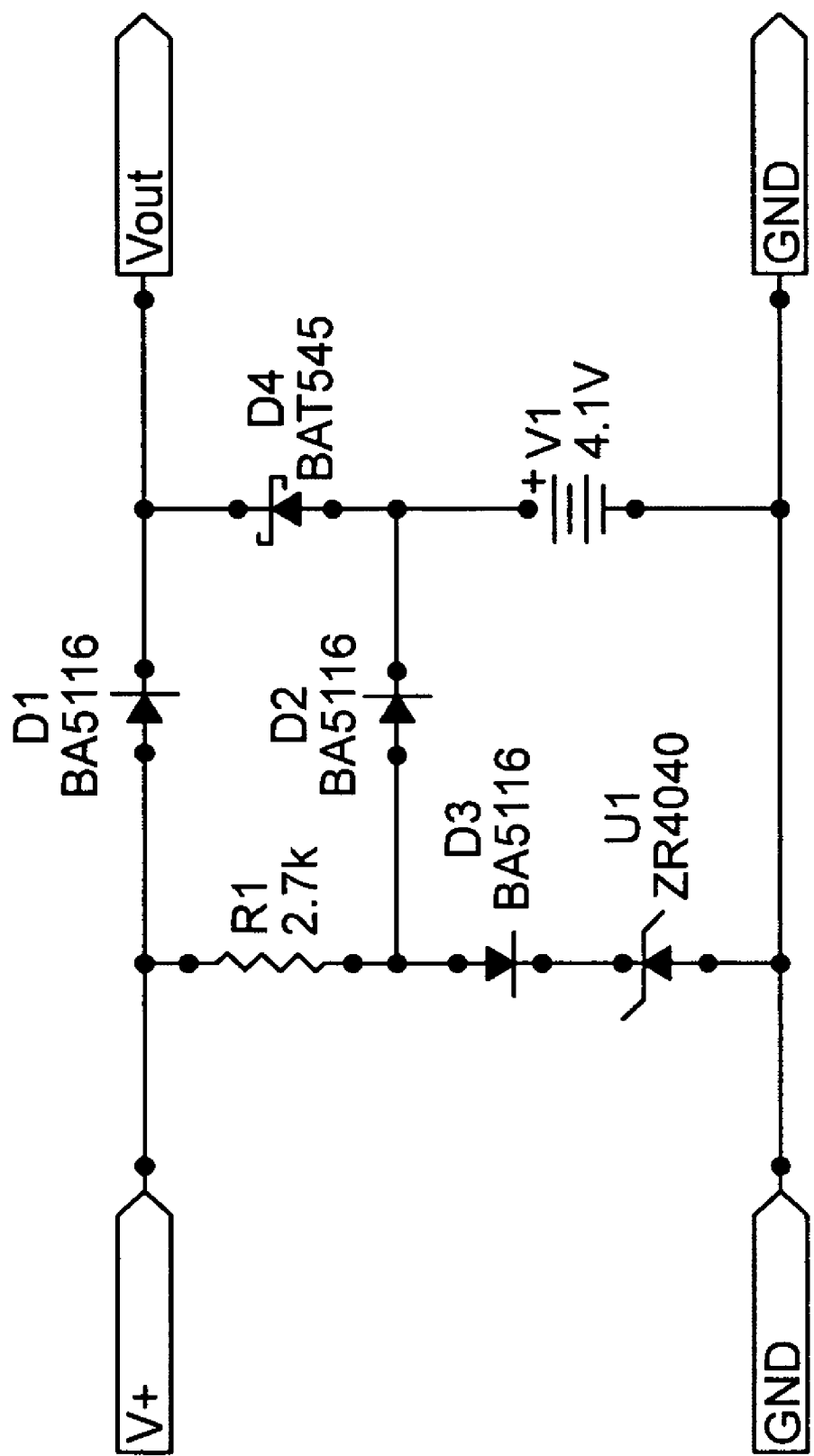
FIG. 8 is a schematic of the unitary package having a solid-state cell (e.g., Lithium-ion battery cell) and its charging circuitry (a 3-terminal device with input, output and ground terminals), according to some embodiments of the invention.

Referring now to FIG. 8 a schematic of the unitary package having a solid-state cell (e.g., Lithium-ion battery cell) and its charging circuitry (a 3-terminal device with input, output and ground terminals), according to some embodiments of the invention is depicted. In an exemplary embodiment, diode D4 could be replaced with the same diode used for D1, D2, and D3, so that a quad diode pack (or two dual packs) could be used. BAV170 is a suitable substitute for BAS116. Many other diode types are also available and can be used depending on the forward voltage drop and reverse current blocking characteristics, in addition to size and cost considerations.

Figure 9:
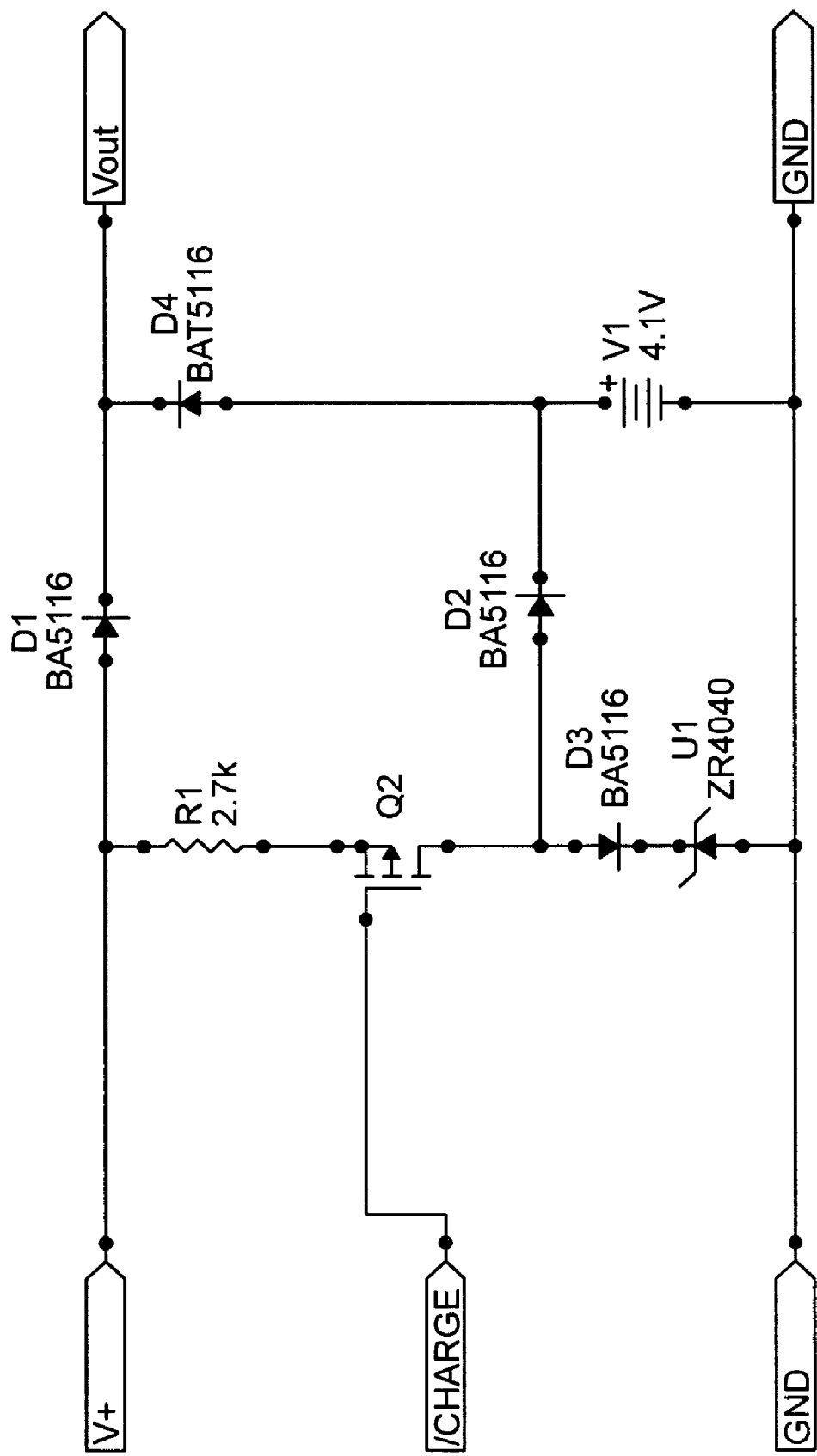
FIG. 9 is a schematic of the unitary package having a solid-state cell (e.g., Lithium-ion battery cell) and its charging circuitry (a 4-terminal device with input, control signal to start and/or stop the charging, output and ground terminals), according to some embodiments of the invention.

FIG. 9 is a schematic of the unitary package having a solid-state cell (e.g., Lithium-ion battery cell) and its charging circuitry (a 4-terminal device with input, control signal to start and/or stop the charging, output and ground terminals), according to some embodiments of the invention. In one exemplary embodiment, Q2 is optional and is suited for very low power applications, where the charge control circuit can be switched on and off according to certain events or to simply conserve power. The /Charge line can be driven high or low from a timer, for example. A quad diode pack could provide D1, D2, D3, and D4.

Figure 10:
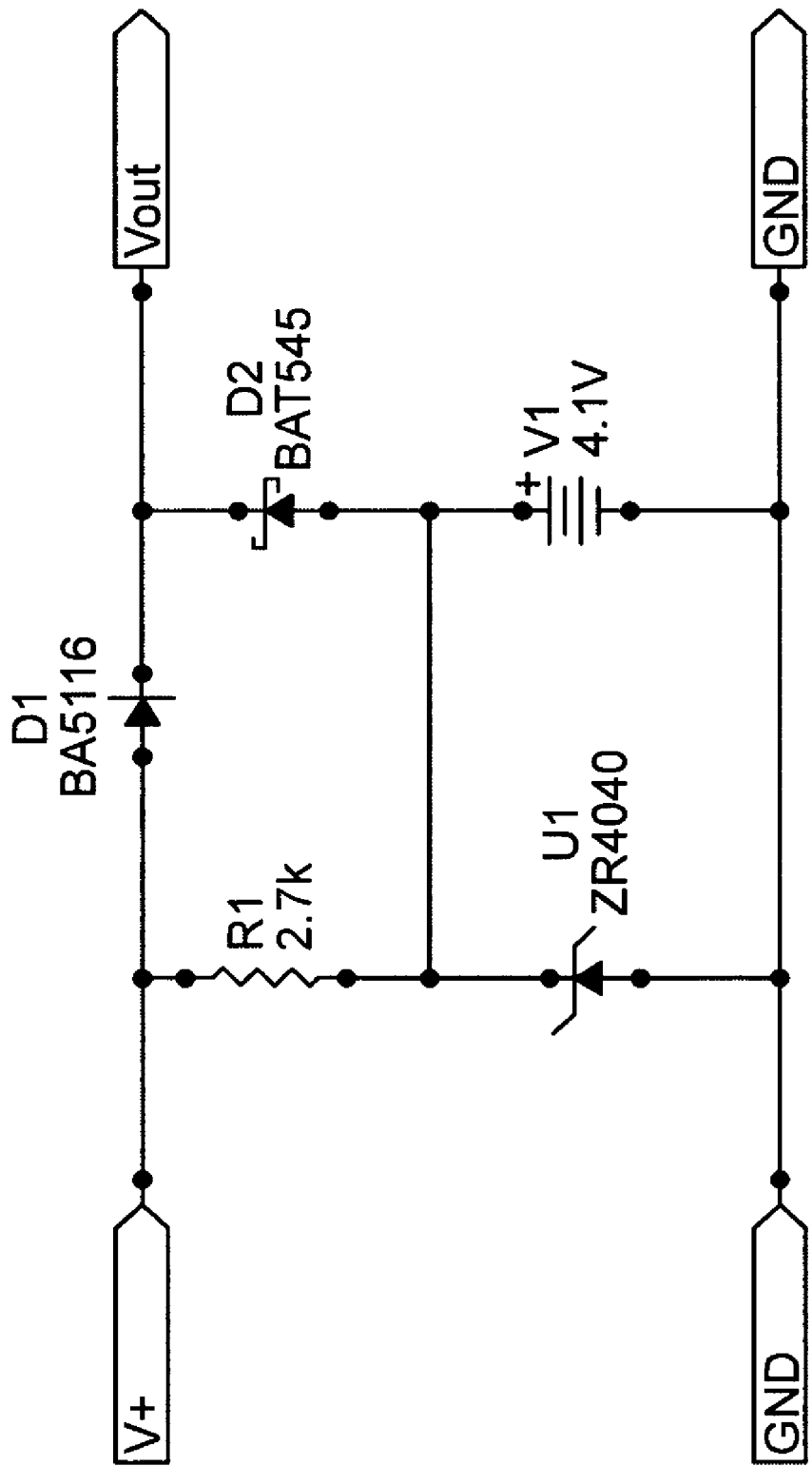
FIG. 10 is a schematic of the unitary package having a solid-state cell (e.g., Lithium-ion battery cell) and its charging circuitry (a 3-terminal device with input, output and ground terminals), according to some embodiments of the invention.

Referring now to FIG. 10 a schematic of the unitary package having a solid-state cell (e.g., Lithium-ion battery cell) and its charging circuitry (a 3-terminal device with input, output and ground terminals), according to some embodiments of the invention is depicted. In one exemplary embodiment, Diode D1 may be replaced with the same diode used for D2 so that a dual diode pack could be used. BAV170 is a suitable substitute for BAS116.

Other charging circuits are possible, including those that shut off the battery charger after a pre-determined amount of charge time; those that cut-off the battery from the load when the battery voltage decays to a limit value; an in-line fusing or disconnect mechanism that limits the current flow to the battery or disconnects it from the circuit in the event that the battery develops a hard or resistive short. This would prevent a short-circuit from unnecessarily draining excessive power from the main supply, which might result in a loss of circuit functionality.

All of the components in the diagrams can be purchased in small, inexpensive, leaded or leadless surface mount formats, thus allowing these circuits to be embedded in a single package such as a leadless chip carrier (LCC), multi-chip module (MCM), ball grid array (BGA), micro-BGA (uBGA), system in package (SiP), and other package types, either with or without the inclusion of the thin film battery for which the control circuit is designed to charge.

Figure 11:
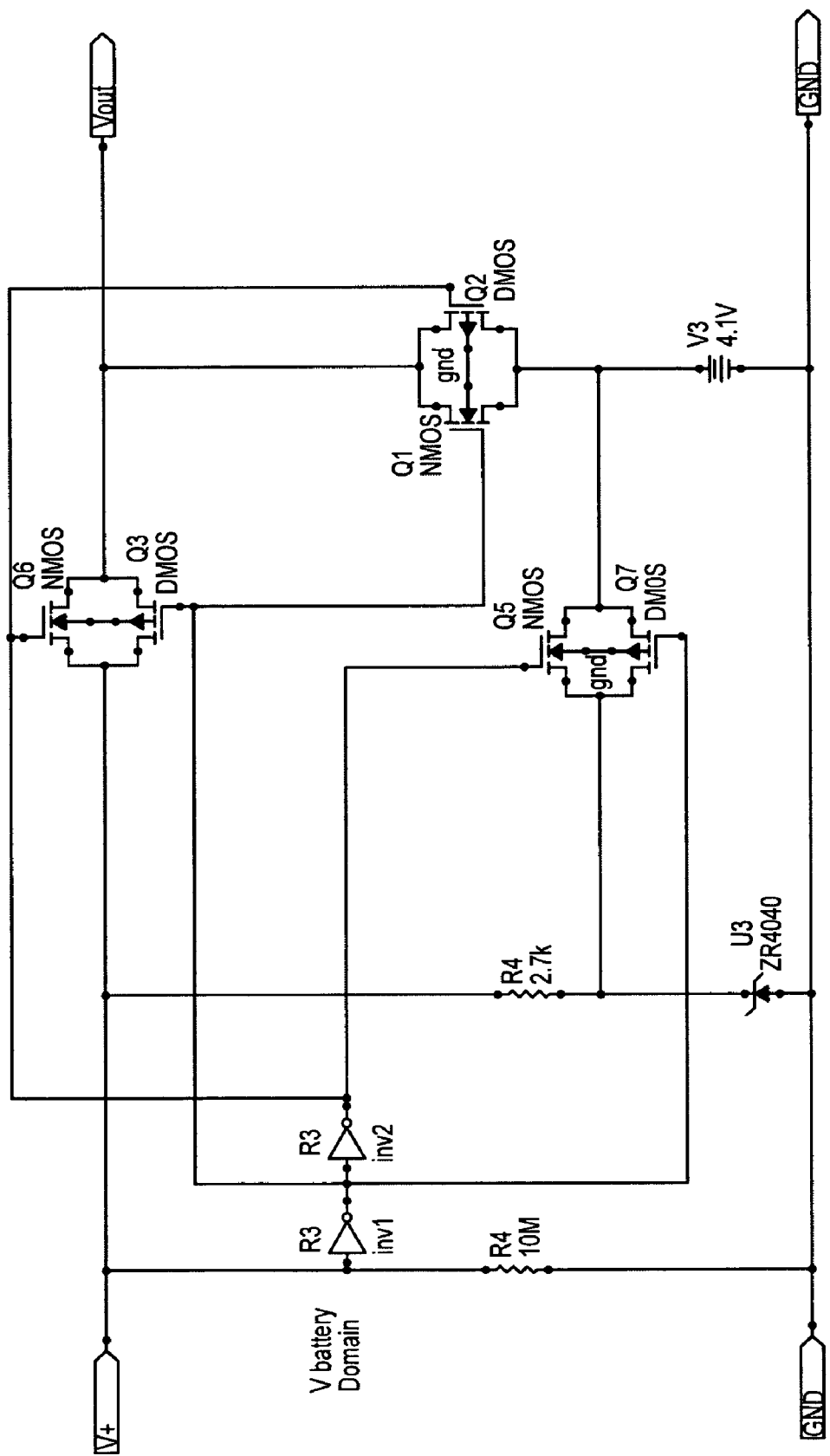
FIG. 11 is a schematic of the unitary package having a solid-state cell (e.g., Lithium-ion battery cell) and its charging circuitry (a 3-terminal device with input, output and ground terminals), according to some embodiments of the invention.

FIG. 11 is a schematic of the unitary package having a solid-state cell (e.g., Lithium-ion battery cell) and its charging circuitry (a 3-terminal device with input, output and ground terminals), according to some embodiments of the invention. In an exemplary embodiment, the circuit uses analog transmission gates for isolation. Further, inv1 and inv2 are powered in the battery voltage domain.

Figure 12:
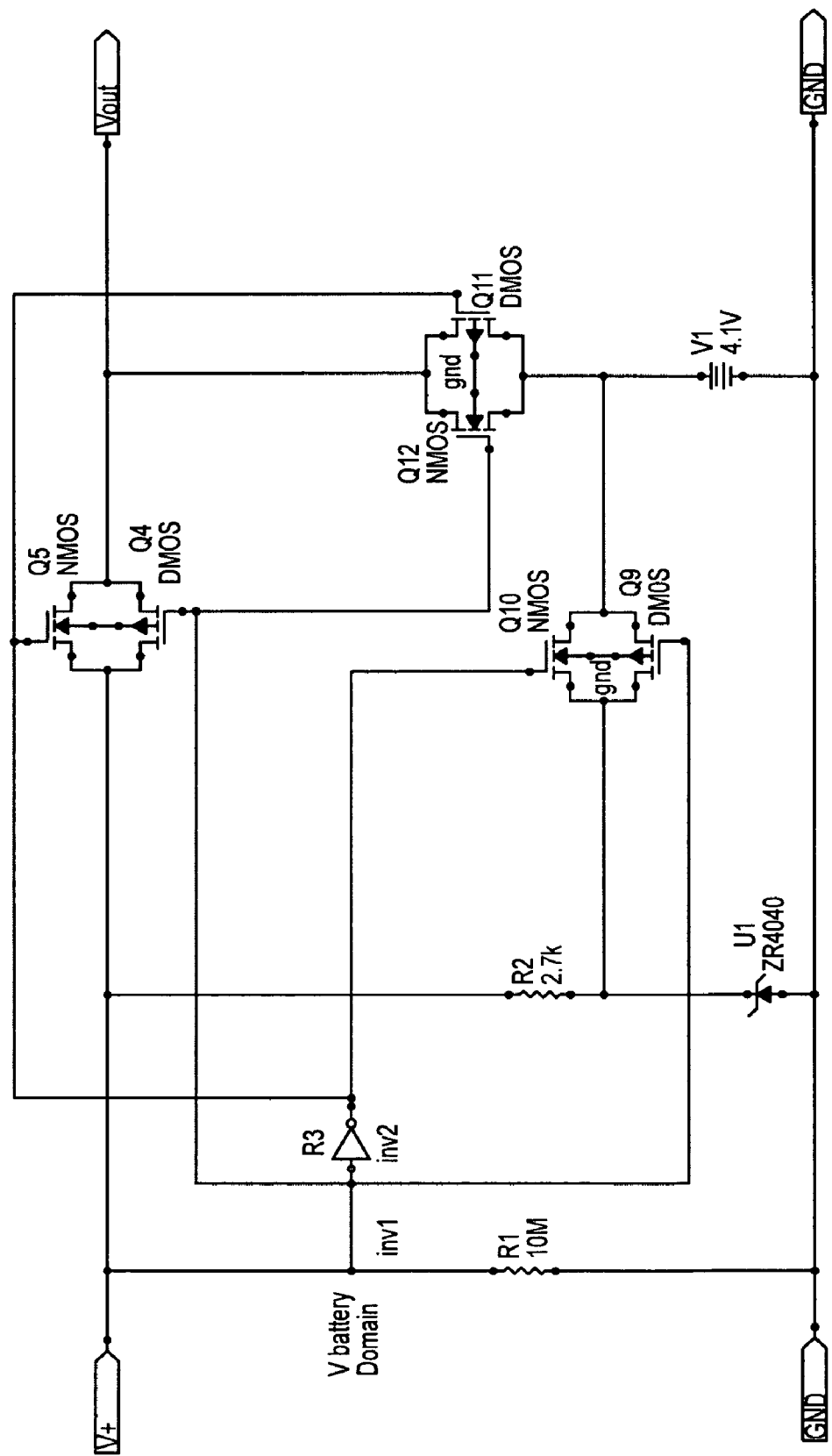
FIG. 12 is a schematic of the unitary package having a solid-state cell (e.g., Lithium-ion battery cell) and its charging circuitry (a 3-terminal device with input, output and ground terminals), according to some embodiments of the invention.

Referring now to FIG. 12 a schematic of the unitary package having a solid-state cell (e.g., Lithium-ion battery cell) and its charging circuitry (a 3-terminal device with input, output and ground terminals), according to some embodiments of the invention is depicted.

Figure 13:
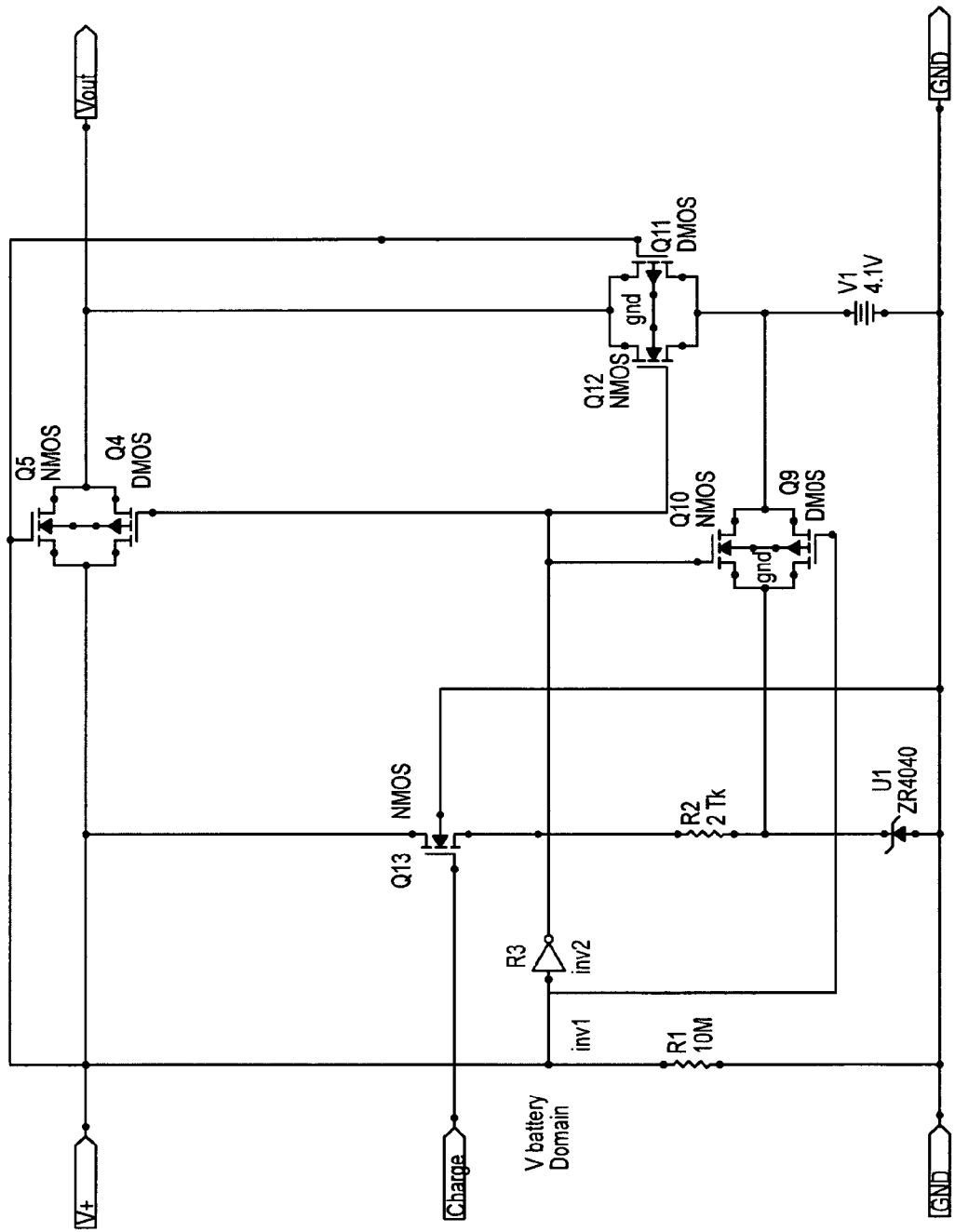
FIG. 13 is a schematic of the unitary package having a solid-state cell (e.g., Lithium-ion battery cell) and its charging circuitry (a 4-terminal device with input, control signal to start and/or stop the charging, output and ground terminals), according to some embodiments of the invention.

FIG. 13 depicts an exemplary schematic of the unitary package having a solid-state cell (e.g., Lithium-ion battery cell) and its charging circuitry (a 4-terminal device with input, control signal to start and/or stop the charging, output and ground terminals), according to some embodiments of the invention.

Figure 14:
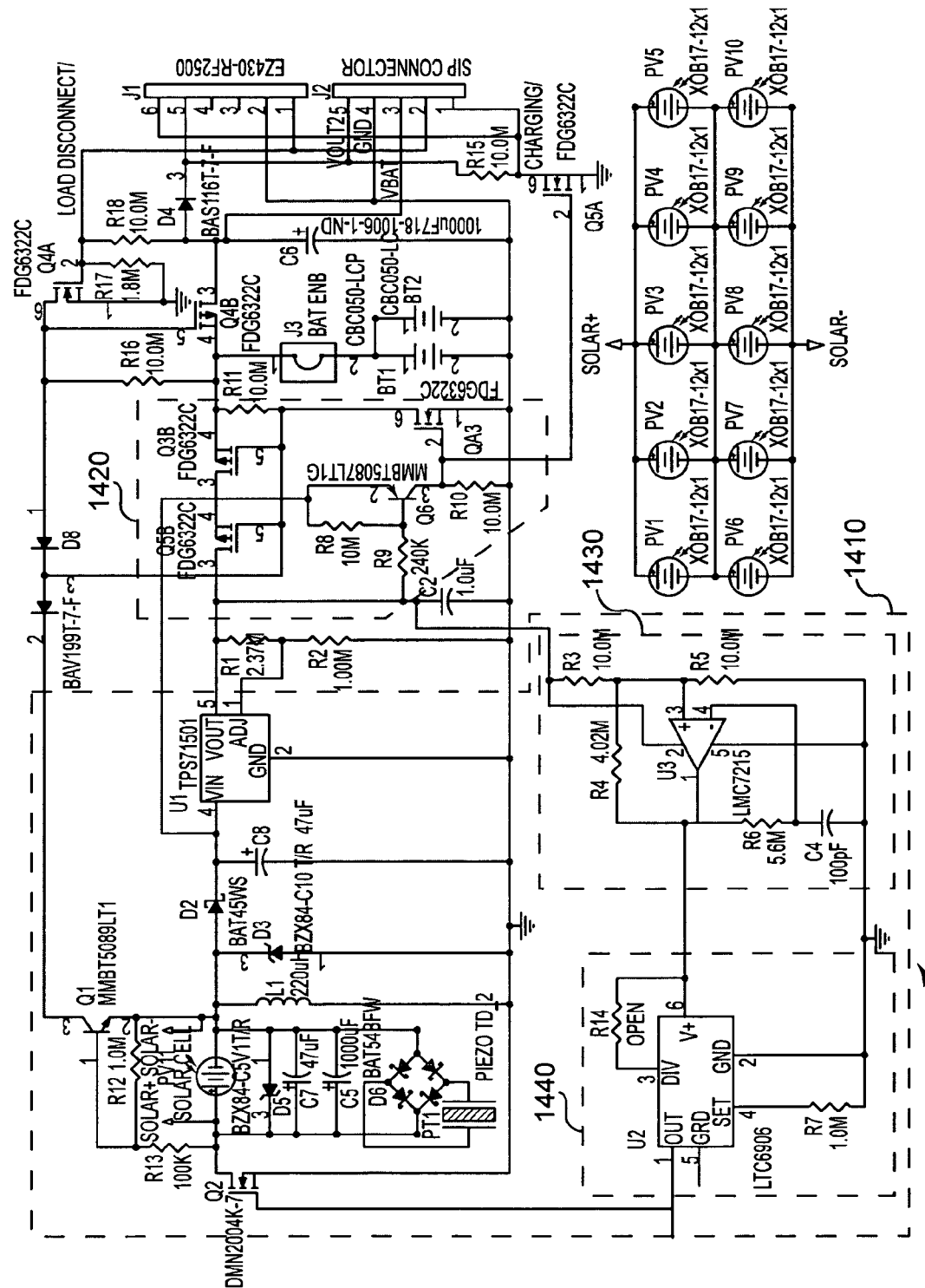
FIG. 14 is a schematic of an energy harvesting and charging circuit, according to some embodiments of the invention.

Referring now to FIG. 14, an energy harvesting, conditioning and control circuit 1800 is depicted. Circuit 1400 comprises a plurality of subsystems or sub-circuits. A subsystem 1410 comprises an energy or power conversion circuit detailed in International Publication No. WO 2007/048052 having an international filing date of Oct. 23, 2006, entitled "SYSTEMS AND METHODS FOR RECEIVING AND MANAGING POWER IN WIRELESS DEVICES', by Regan Zane et al. and which is herein incorporated by reference. Circuit 1410 comprises a buck boost converter configuration including inductor L1 which is energized as transistor Q2 is turned on. The buck boost converter may function to maintain a relatively constant charging voltage. The voltage comparator, comprising transistor Q6, and resistors R8, R9, and R10, drives switching to disconnect the batteries from the voltage regulator when there is insufficient voltage to charge the batteries. For example, transistors Q3A and Q6 will turn off transistors Q5B and Q3B thereby isolating batteries BT1 and BT2 from the charging circuit. Integrated circuit U1 acts as a voltage regulator to monitor and control the charger voltage.

The voltage from charging circuit (comprising solar cells PV11, or other charging elements) is boosted through diode D2. Circuit 1410 requires a threshold power to get initiated with a charger disable circuit 1420. When the transducer voltage gets above a threshold value, Q1 will turn on causing backflow through the path to pin 2 of the comparator U3. Charger disable circuit 1420 provides an indication to the application circuit that there is sufficient power to charge the battery. Circuit 1820 comprises two gate switches Q5B and Q3B which function to maintain isolation of the battery BT1 and BT2 selectively and maintaining zero leakage current when the batteries are not being charged or there is not sufficient power to do so. Circuit 1420 is further described in U.S. Publication No. 2008/0001577 A1, filed on Jul. 2, 2007, entitled "THIN-FILM BATTERY RECHARGING SYSTEMS AND METHODS', by Jeffrey S. Sather and which is herein incorporated by reference. Transistor Q5A is used to send a signal to the microcontroller that no power is going to the battery for monitoring and control. Circuits 1410 and 1420 combine to enable restarting of the charging circuits by utilizing power from the batteries at the point in which everything has been shut down.

Figure 15:
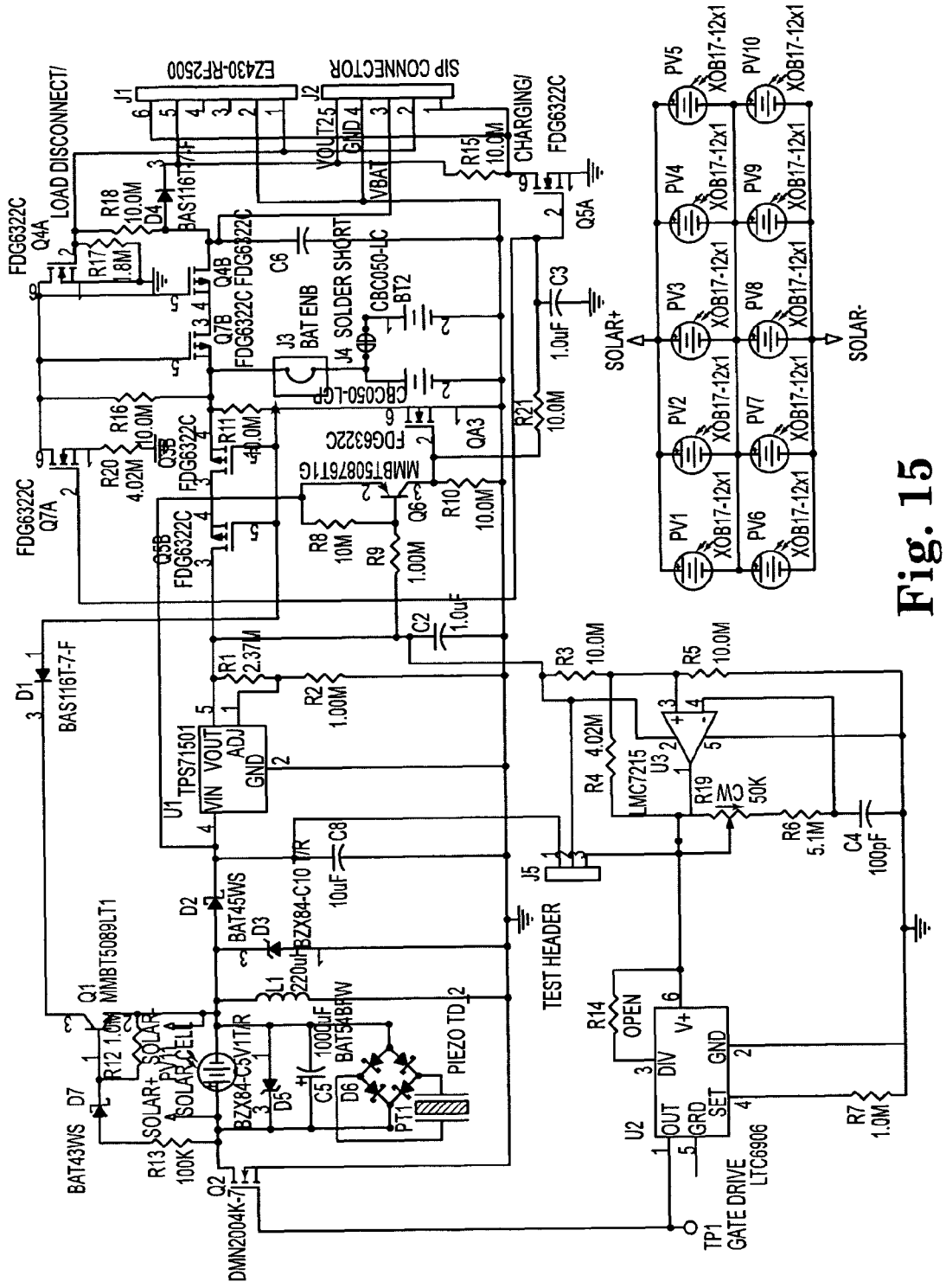
FIG. 15 is an alternative schematic of an energy harvesting and charging circuit, according to some embodiments of the invention.

In an exemplary embodiment, Circuit 1410 comprises a low speed oscillator 1430 (e.g. operating at about 500 Hz) and a high speed oscillator 1440. Low speed oscillator gates the high speed oscillator (on/off) and helps to match the input impedance to the output impedance. In an exemplary embodiment, the combination of circuits 1410 and 1420 maintain several functions including but not limited to isolating battery from discharging to the charge circuits, starting the charging circuits after the charging circuits were shut down for lack of charging voltage, and isolating the batteries from the load when the battery voltage gets too low below a predetermined threshold. In another exemplary embodiment FIG. 15 depicts a similar circuit to FIG. 14 but having improved performance characteristics. For example a variable resistor R19 is used in the low speed oscillator circuit to precisely trim the oscillator frequency. This action provides improved efficiency in low light conditions. In very low light conditions, it may be possible that the circuit will attempt to operate but not have sufficient energy to charge the battery and thereby depleting the battery over time. Thus, the capacitor C7 was removed from the circuit and the value of capacitor C8 was decreased. Further, diode D7 was added to the base of transistor Q1 to raise the trip voltage of the transistor. These improvements provide assurance that sufficient energy is available in low light situations so that the battery will maintain more energy input than energy output.

Referring to FIGS. 14 and 15, FET Q4A, resistor R17, and resistor R18 form a voltage comparator where the voltage present at the junction of R18 and Q4B is divided by R18 and R17 and presented to the gate of Q4A. The divider ratio of R17 and R18 is setup to be above the FET Q4A's VGS threshold voltage with, in accordance with an exemplary embodiment, a voltage of 3.6V or greater at the junction of R18 and Q4B. If the voltage at the gate of Q4A is below the VGS threshold voltage (battery voltage is 3.6V or less) then Q4A will come out of its low resistance state and the drain voltage on Q4A will begin to rise. As the drain voltage of Q4A rises, the gate drive voltage is reduced to P channel FET Q4B and the drain of Q4B will began to become more resistive causing the gate drive on Q4A to be decreased so overall the circuit becomes degenerative and both Q4A and Q4B will be turned off. Q4B being turned off will then cause the output application circuit load to be disconnected from the battery.

In FIG. 14, FET Q4A and Q4B will be turned on and the application circuit will also be turned on any time the energy transducer has sufficient voltage to trip voltage comparator Q1.

In FIG. 15, through the addition of FET Q7A, FET Q4A and Q4B will be turned on and the application circuit will also be turned on only when the battery has been charged or more then enough energy is available to charge a depleted battery. This implementation insures that the application circuit will always have the benefit of a fully charged battery or sufficient energy when ever power is made available to the application circuit.

Further differences between the circuit of FIG. 14 and the circuit of FIG. 15 include resistors R8 and R9 being larger to keep the output of the voltage regulator U1 from going out of regulation (voltage to high) when the battery is fully charged without a load on the output in strong light conditions. Also, the output cutoff circuit was changed with the addition of Q7A so that the output will not be enabled until the battery is nearly fully charged. Further, R21 and C3 are connected to the gate of Q7A to keep the output from being pulsed on during low light conditions. Although various circuit designs with various circuit elements are described and depicted, it is likely though not necessary that the resulting circuit when put into practice will be in an ASIC, microprocessor, or other integrated circuit which will maintain similar functionality but will require a different hardware/software implementation. Such a circuit design is not viewed as departing from the scope of the invention.

Figure 16:
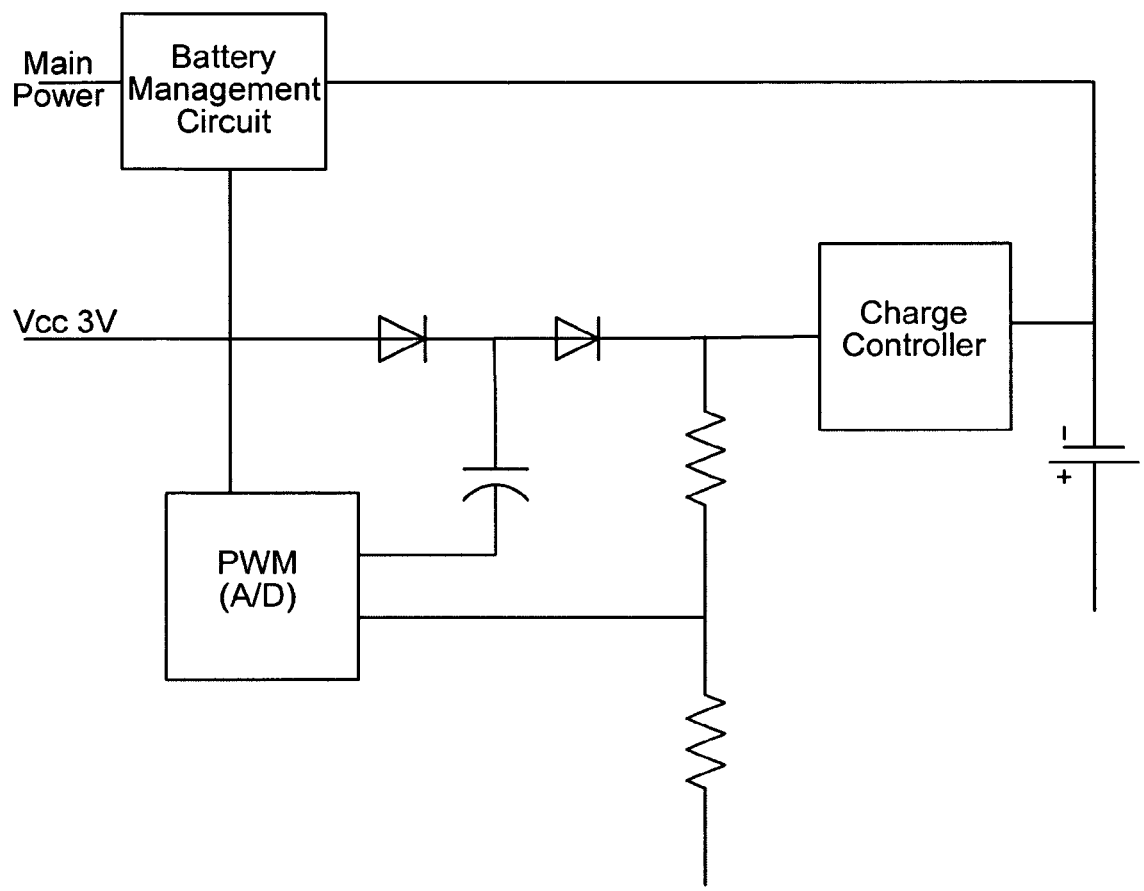
FIG. 16 is a block diagram and schematic of an exemplary charging system using a charge pump and microcontroller, according to some embodiments of the invention.
Figure 17:
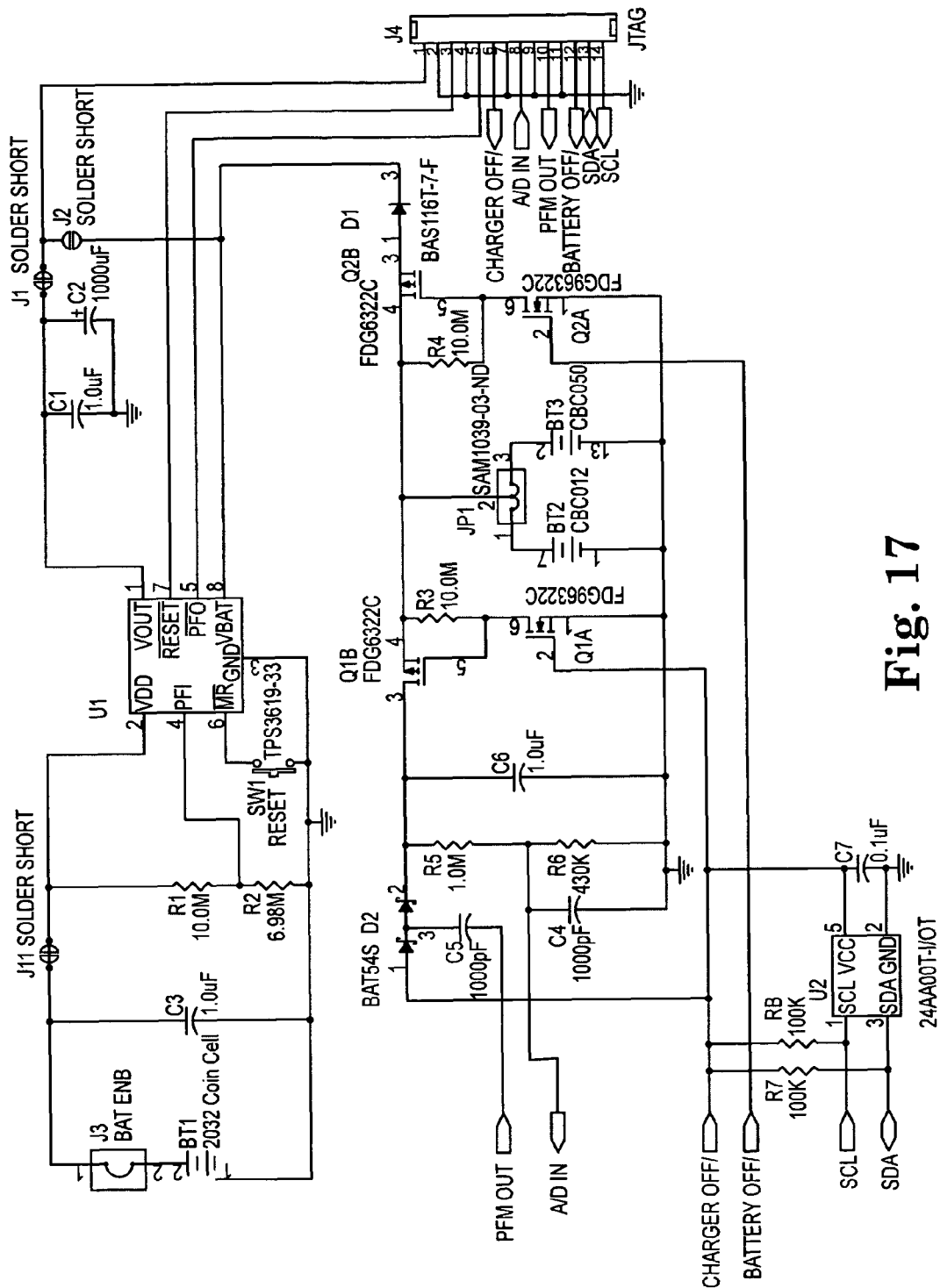
FIG. 17 is a schematic of a microcontroller charge pump, according to some embodiments of the invention.
Figure 18:
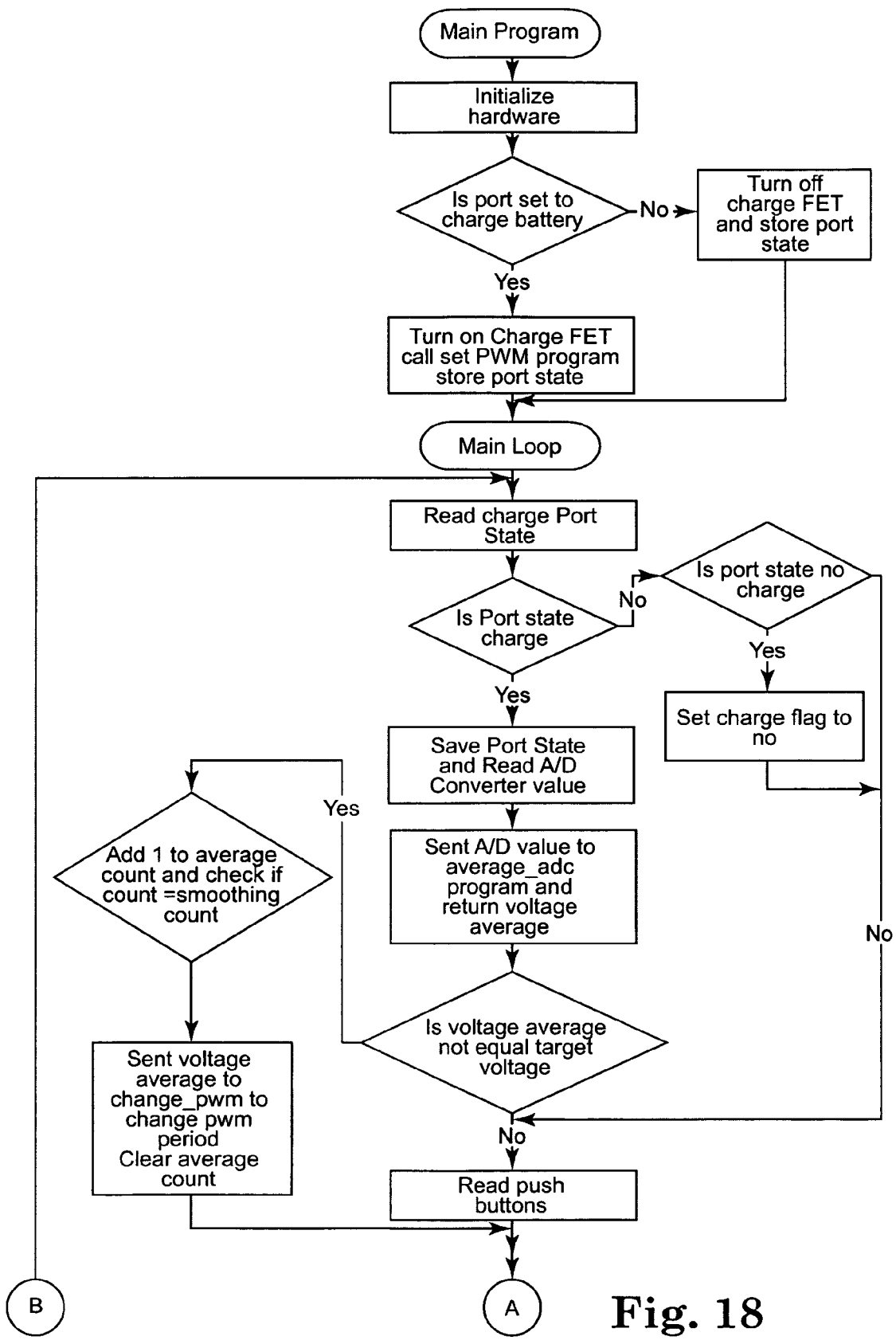
FIGS. 18-29 are flow diagrams for the software for the microcontroller charge pump, according to some embodiments of the invention.
Figure 19:
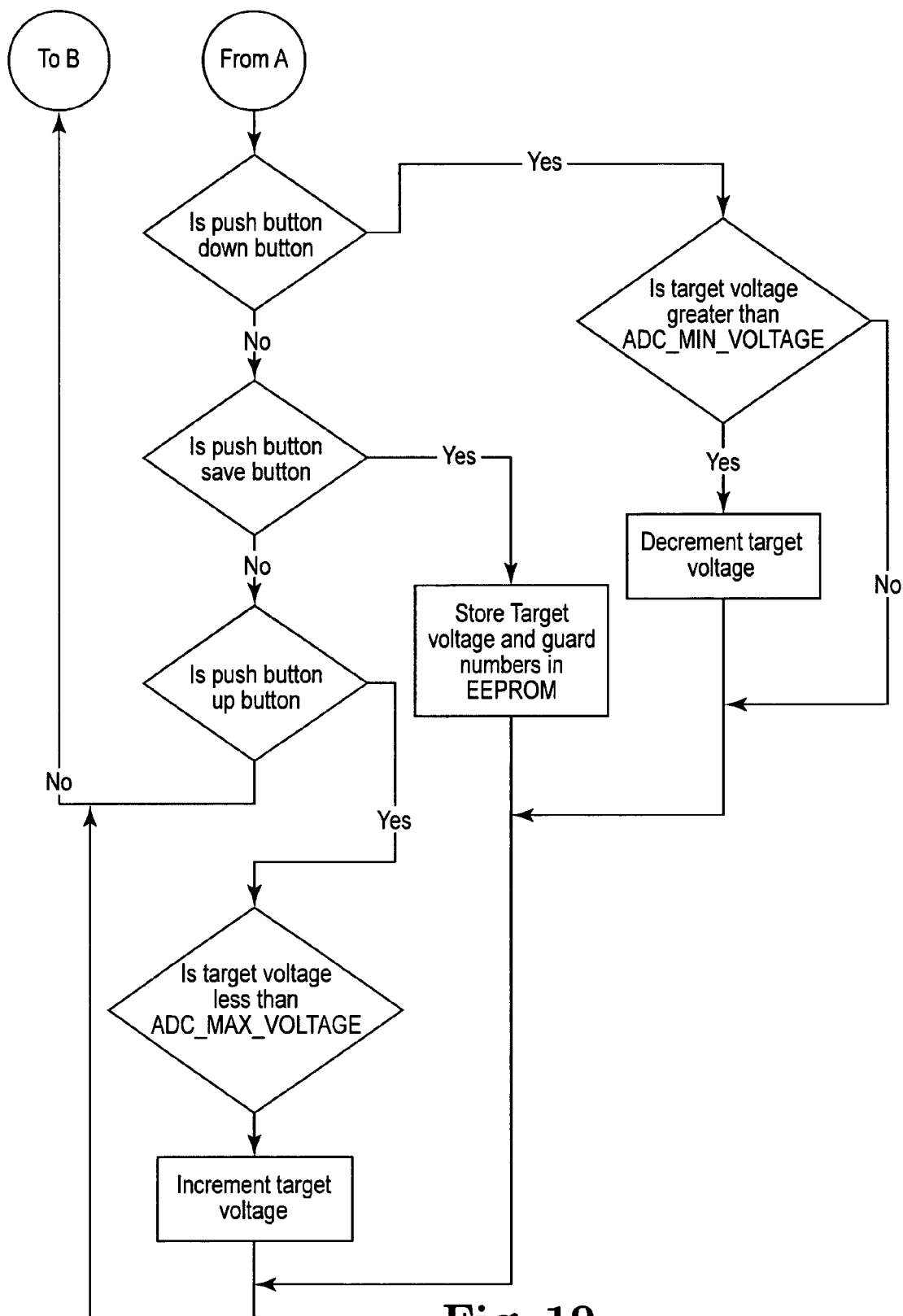
Figure 20:
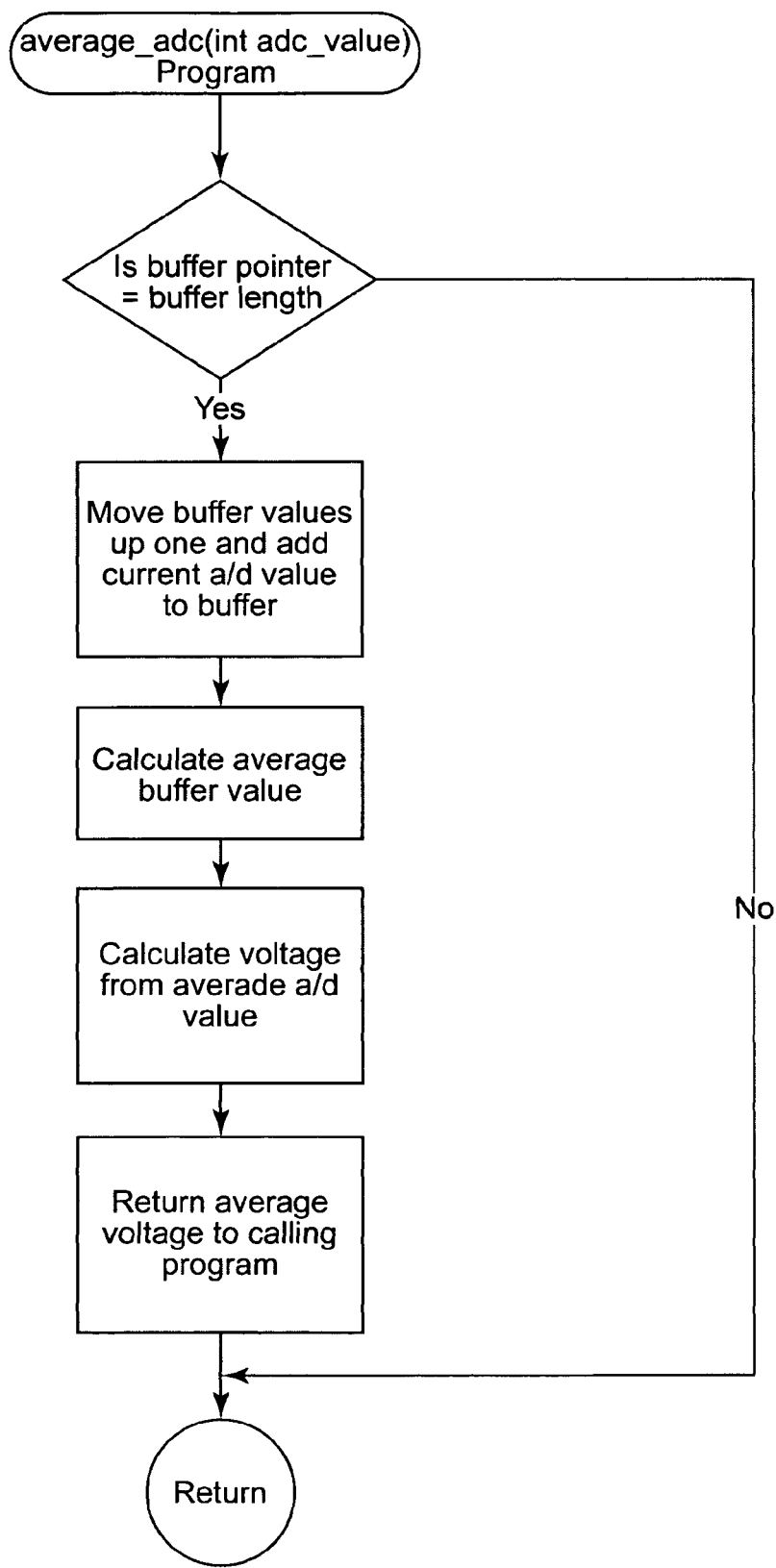
Figure 21:
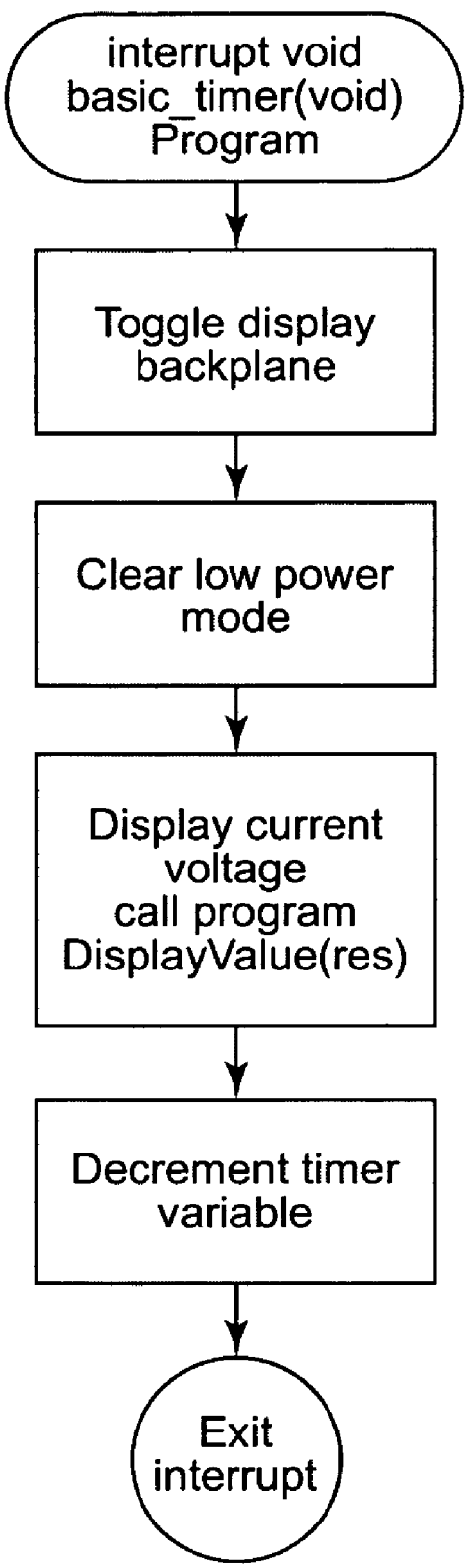
Figure 22:
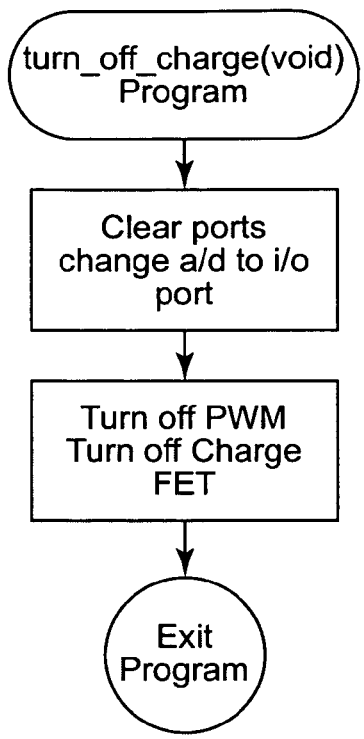
Figure 23:
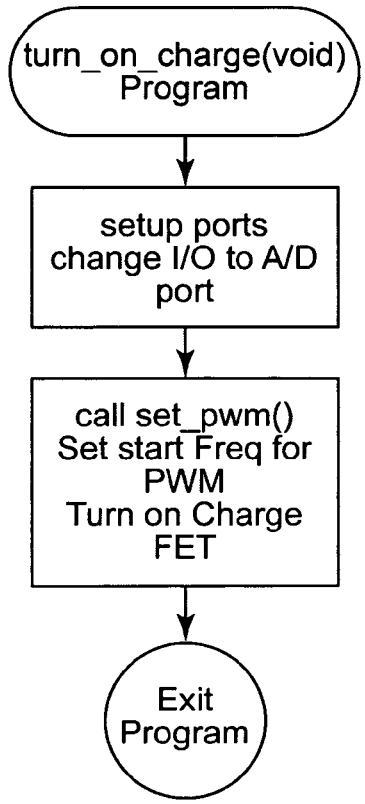
Figures 24, 25:
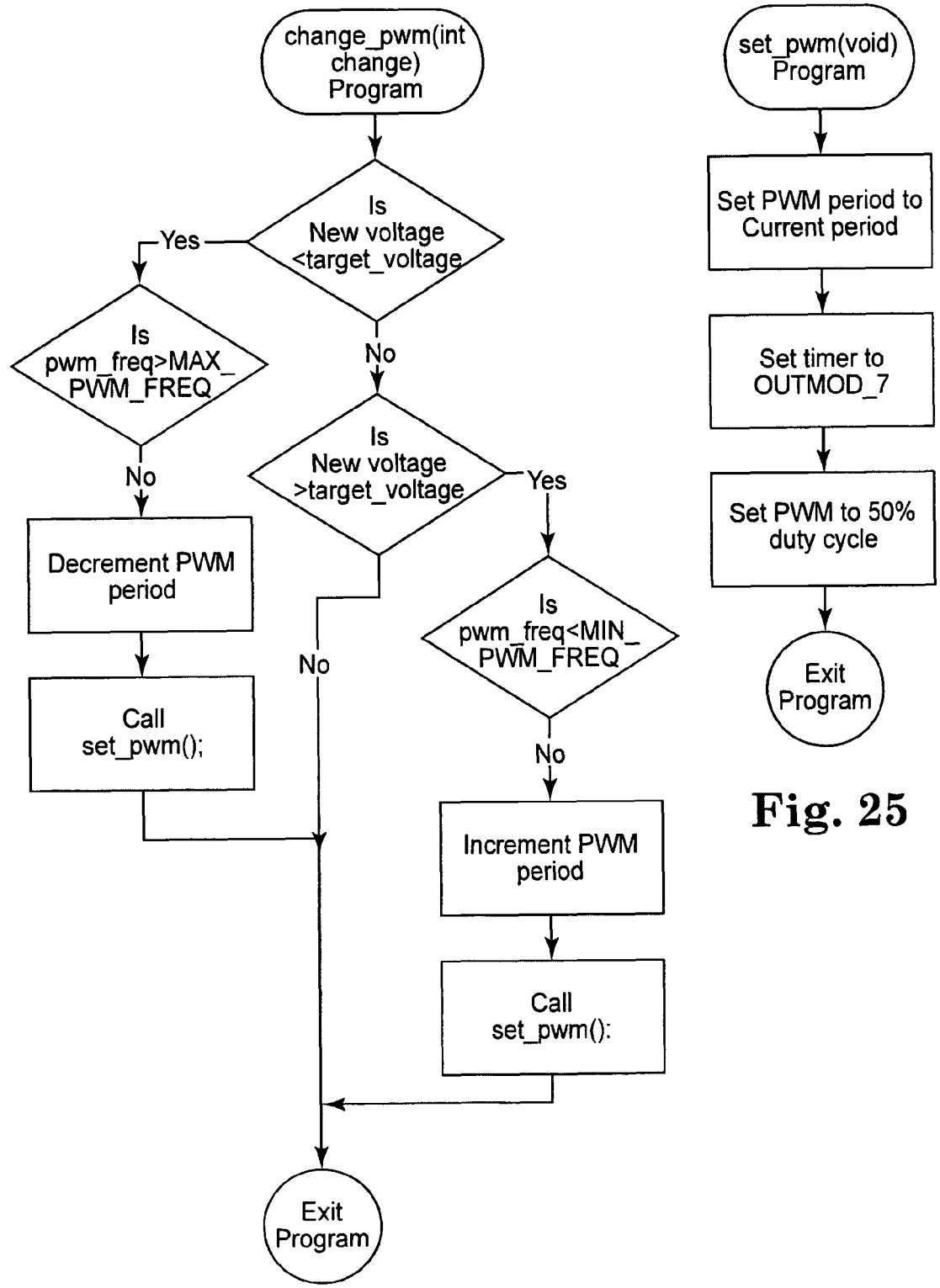
Figure 26:
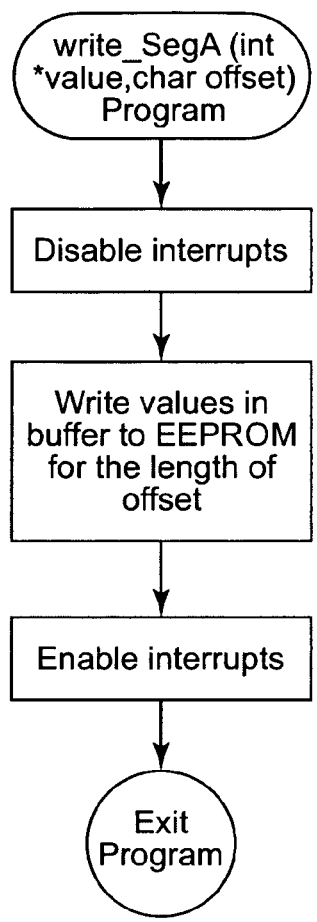
Figure 27:
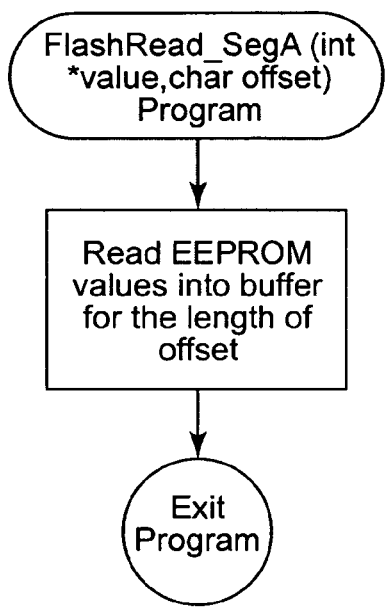
Figure 28:
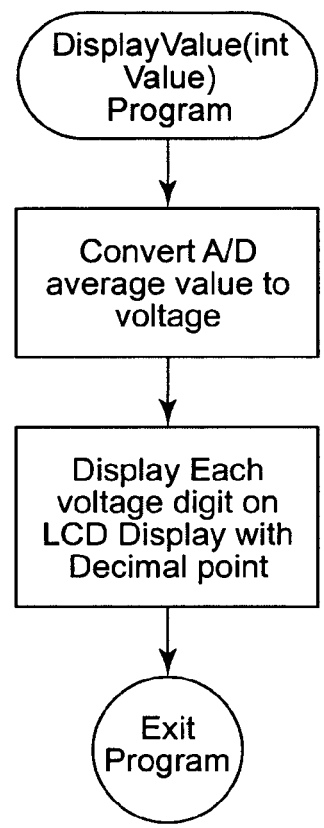
Figure 29:
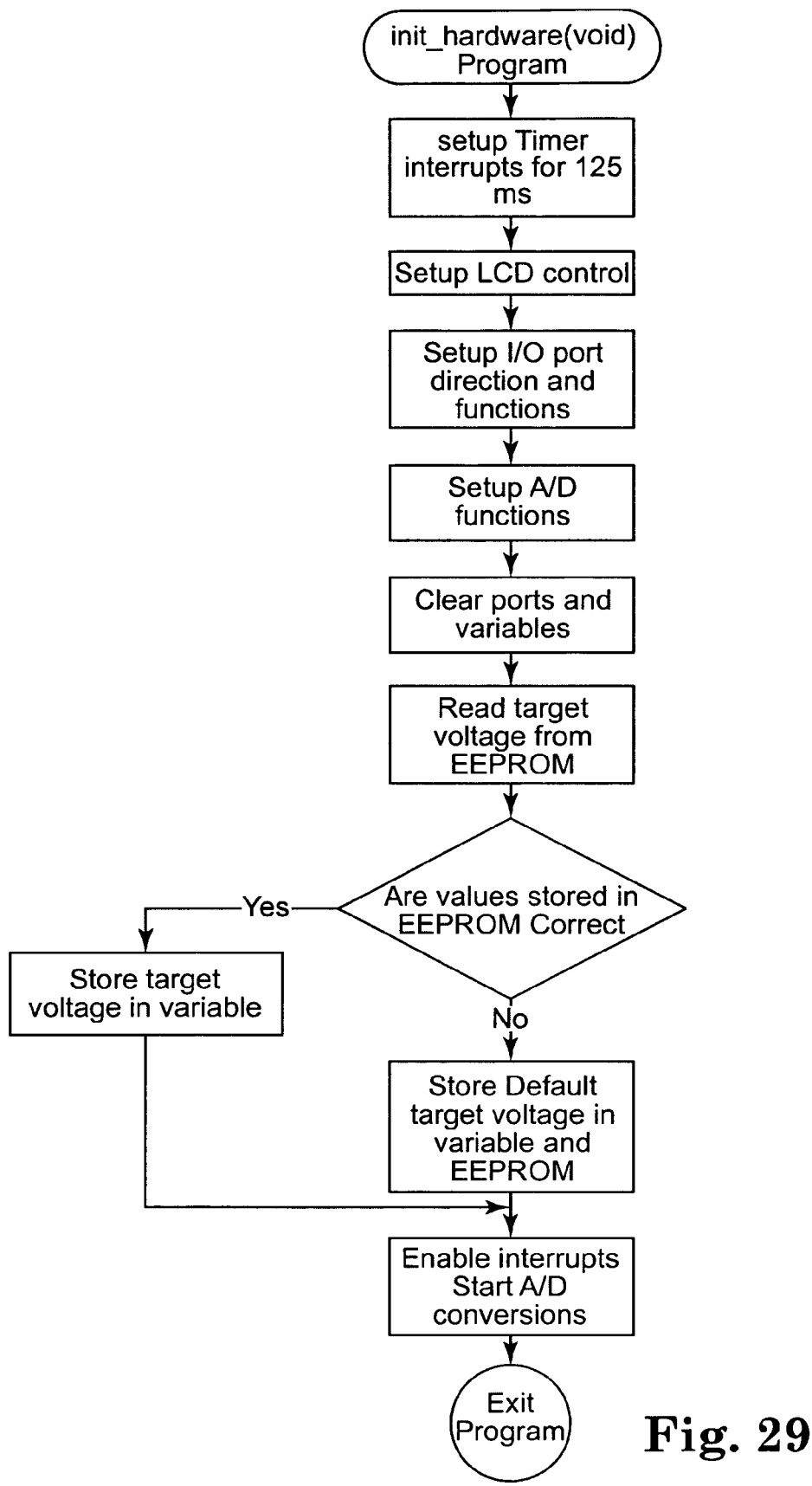

Referring now to FIG. 16, a generalized battery charging circuit is depicted. The circuit may be used to boost the voltage Vcc from a 3V level up to a level that is used to charge the battery (e.g. 4.1 V). A pulse width modulator (PWM) based A/D may be used as a charge pump, an example of which is depicted in FIG. 17, to boost the incoming voltage in combination with a microcontroller (Battery Management Circuit). The microcontroller controlled charge pump may include software which helps to adjust signal frequency to the correct or sufficient level. Such software is detailed in the flow diagrams provided in FIGS. 18-29. The microcontroller insures that the charge voltage is maintained at the desired input level.

In some embodiments, the circuits are implemented in an ASIC, while in other embodiments, the circuits use one or more discreet components.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. An apparatus comprising:
    a device in a unitary package the device including:
    a charging input terminal;
    a power output terminal;
    a ground terminal;
    a thin-film lithium-ion battery having a first electrical contact electrically connected to the ground terminal and having a second electrical contact;
    at least two series-connected transistors that provide a selectively enabled electrical connection between the charging input terminal and the second electrical contact of the battery;
    at least two series-connected transistors that provide a selectively enabled electrical connection between the second electrical contact of the battery and the power output terminal; and
    at least two series-connected transistors that provide a selectively enabled electrical connection between the charging input terminal and the power output terminal.

2. The apparatus of claim 1, further comprising:
    a third transistor series connected with the at least two series-connected transistors that provide the selectively enabled electrical connection between the charging input terminal and the second electrical contact of the battery, wherein the third transistor is selectively enabled based on an externally applied control voltage.

3. The apparatus of claim 1, wherein all of the mentioned transistors are part of a single application-specific integrated circuit (ASIC).

4. The apparatus of claim 1, wherein at least some of the mentioned transistors are discrete parts.

5. An apparatus comprising:

a device in a unitary package the device including:

a charging input terminal;

a power output terminal;

a ground terminal;

a thin-film lithium-ion battery having a first electrical contact electrically connected to the ground terminal and having a second electrical contact;

at least two series-connected transistors that provide a selectively enabled electrical connection between the charging input terminal and the second electrical contact of the battery;

a low-forward-voltage-drop (or Schottky) diode that provides a selectively enabled electrical connection between the second electrical contact of the battery and the power output terminal; and a low-forward-voltage-drop (or Schottky) diode that provides a selectively enabled electrical connection between the charging input terminal and the power output terminal.

* * * * *